(12) United States Patent
Kitano et al.

(10) Patent No.: US 12,111,665 B2
(45) Date of Patent: Oct. 8, 2024

(54) IMAGE PROCESSING DEVICE, MOBILE ROBOT CONTROL SYSTEM, AND MOBILE ROBOT CONTROL METHOD

(71) Applicant: THK CO., LTD., Tokyo (JP)

(72) Inventors: Hitoshi Kitano, Tokyo (JP); Tsubasa Usui, Tokyo (JP)

(73) Assignee: THK CO., LTD., Tokyo (JP)

( * ) Notice: Subject to any disclaimer, the term of this patent is extended or adjusted under 35 U.S.C. 154(b) by 1134 days.

(21) Appl. No.: 16/767,441

(22) PCT Filed: Nov. 15, 2018

(86) PCT No.: PCT/JP2018/042224
§ 371 (c)(1),
(2) Date: May 27, 2020

(87) PCT Pub. No.: WO2019/107164
PCT Pub. Date: Jun. 6, 2019

(65) Prior Publication Data
US 2020/0401158 A1 Dec. 24, 2020

(30) Foreign Application Priority Data

Nov. 28, 2017 (JP) .................................. 2017-227765
Apr. 9, 2018 (JP) .................................. 2018-074860

(51) Int. Cl.
*G05D 1/00* (2024.01)
*G06K 7/14* (2006.01)
*G06T 7/70* (2017.01)

(52) U.S. Cl.
CPC .......... *G05D 1/0272* (2013.01); *G05D 1/0234* (2013.01); *G06K 7/14* (2013.01); *G06T 7/70* (2017.01)

(58) Field of Classification Search
CPC ............... G05D 1/0272; G05D 1/0234; G05D 2201/0216; G06K 7/14; G06K 7/10712;
(Continued)

(56) References Cited

U.S. PATENT DOCUMENTS 8,368,759 B2 * 2/2013 Yoo ...................... G05D 1/0234
348/139
9,513,627 B1 * 12/2016 Elazary ............ G05B 19/41865
(Continued)

FOREIGN PATENT DOCUMENTS

CN 106595634 A 4/2017
JP H09-128041 A 5/1997
(Continued)

OTHER PUBLICATIONS

Office Action dated Dec. 21, 2022, issued in counterpart CN application No. 201880077035.1, with English translation. (15 pages).

(Continued)

*Primary Examiner* — Thomas Ingram
(74) *Attorney, Agent, or Firm* — WHDA, LLP

(57) ABSTRACT

This image processing device includes: a detection object including cells having first cells capable of reflecting emitted light and second cells incapable of reflecting the emitted light, the cells being squares or rectangles, the first cells and the second cells being arranged in an a×a or a×b (where a, b=3, 4, 5, 6, . . . ) matrix on a two-dimensional plane; and a detector including: an illuminator emitting light; imagers imaging, by a camera, light reflected from the first cells after the first cells and the second cells constituting the detection object are illuminated with the light emitted from the illuminator; and a calculator obtaining information set on the detection object 11, based on imaged data items taken by the (Continued)

imagers. Such a configuration can accurately identify a compact marker and measure the distance, and achieve a system inexpensively.

10 Claims, 18 Drawing Sheets

(58) Field of Classification Search
CPC .............. G06K 7/1417; G06T 7/70; G06T 2207/10048; G06T 2207/30204; G06T 7/73; G01C 3/16; G01C 11/30; G01C 21/206

See application file for complete search history.

(56) References Cited

U.S. PATENT DOCUMENTS

| | | |
|---|---|---|
| 2006/0129276 A1 | 6/2006 | Watabe et al. |
| 2006/0293810 A1 | 12/2006 | Nakamoto |
| 2010/0188510 A1* | 7/2010 | Yoo .......................... G06T 7/70 901/1 |
| 2011/0196562 A1 | 8/2011 | Kume et al. |
| 2016/0091899 A1* | 3/2016 | Aldred .................... B60L 50/52 901/1 |
| 2017/0225891 A1* | 8/2017 | Elazary ................ G05D 1/0234 |
| 2017/0329333 A1* | 11/2017 | Passot ................. A47L 11/4061 |
| 2018/0150972 A1* | 5/2018 | Zhu .......................... G06T 7/248 |
| 2018/0239343 A1* | 8/2018 | Voorhies .............. G05D 1/0289 |
| 2021/0397197 A1* | 12/2021 | Robinson ............. G05D 1/0234 |

FOREIGN PATENT DOCUMENTS

| | | |
|---|---|---|
| JP | 2002-73170 A | 3/2002 |
| JP | 2004-303137 A | 10/2004 |
| JP | 2006-167844 A | 6/2006 |
| JP | 2006-185240 A | 7/2006 |
| JP | 2006-346767 A | 12/2006 |
| JP | 2007-10335 A | 1/2007 |
| JP | 2010-521733 A | 6/2010 |
| JP | 2011-170486 A | 9/2011 |
| JP | 2014-21624 A | 2/2014 |
| WO | 2011/013377 A1 | 2/2011 |

OTHER PUBLICATIONS

Office Action dated Feb. 7, 2023, issued in counterpart JP application No. 2018-074860, with English translation. (4 pages).
Office Action dated Jun. 22, 2022, issued in counterpart TW Application No. 107142270. (11 pages).
Office Action dated Sep. 13, 2022, issued in counterpart JP Application No. 2018-074860, with English Translation. (5 pages).
Office Action dated Apr. 5, 2022, issued in counterpart JP Application No. 2018-074860, with English Translation. (6 pages).
International Search Report dated Jan. 29, 2019, issued in counterpart International Application No. PCT/JP2018/042224. (1 page).

* cited by examiner

Fig. 8

| MARKER ID | PATHWAY DISTANCE | PLACEMENT SIDE | DIRECTION SWITHING | LAST MARKER |
|---|---|---|---|---|
| 1 | $D_1$ | LEFT | 0 DEGREES | NO |
| 2 | $D_2$ | LEFT | 0 DEGREES | NO |
| ⋮ | ⋮ | ⋮ | ⋮ | ⋮ |
| m | $D_m$ | LEFT | 90 DEGREES | NO |
| ⋮ | ⋮ | ⋮ | ⋮ | ⋮ |
| M | $D_M$ | LEFT | 0 DEGREES | YES |

Fig. 16

| MARKER ID | OPERATION | MARKER DISTANCE | TURN | TRANSLATION DISTANCE |
|---|---|---|---|---|
| 0 | STOP | 1 m RIGHT | 0 DEGREES | 1m |
| 1 | STOP | 1 m RIGHT | RIGHT TURN BY 180 DEGREES | 1m |
| 2 | TRAVEL STRAIGHT | 1 m RIGHT | 0 DEGREES | 1m |
| 3 | TURN | 1 m RIGHT | RIGHT TURN BY 90 DEGREES | 1m |
| 4 | TURN | 1 m RIGHT | LEFT TURN BY 90 DEGREES | 1m |

IMAGE PROCESSING DEVICE, MOBILE ROBOT CONTROL SYSTEM, AND MOBILE ROBOT CONTROL METHOD

TECHNICAL FIELD

The present invention relates to an image processing device, a mobile robot control system, and a mobile robot control method.

BACKGROUND ART

Conventionally, a transmitter, such as a beacon, has been used to guide an autonomously moving mobile robot. For example, a robot cleaner as a mobile robot performs an operation of moving toward a charger and being supplied with power by the charger, on the basis of a signal emitted from a beacon included in the charger. A mobile operation robot described in Patent Literature 1 described later detects a position serving as a reference, on the basis of a signal emitted from a beacon, and controls the movement.

In recent years, the utilization range of such a mobile robot has been enlarged. For instance, unmanned conveyance vehicles used in a factory or a distribution warehouse, and service robots in public facilities, such as facilities, a hall, or an airport are examples of utilization of the mobile robots.

Beacons used for such a type of mobile robots are roughly classified not only into those emitting a signal as described above, but also into those to be identified by characteristic shapes or patterns which are referred to as markers. Here, specific examples of markers identified by characteristic shapes or patterns include barcodes and QR codes (R).

CITATION LIST

Patent Literature

Patent Literature 1: Japanese Patent Laid-Open No. 2002-073170

DISCLOSURE OF THE INVENTION

Problems to be Solved by the Invention

As typified by the mobile operation robot described in the aforementioned Patent Literature 1, a system that performs movement control using a signal emitting beacon requires a power source for the signal emitting beacon, and requires many wiring works in a case where multiple beacons are installed. The case of such a system has a problem in that the installation cost increases and the running cost for maintenance increases.

On the other hand, a system configuration using a marker identified by a characteristic shape or pattern requires measurement having a high reading accuracy in identification and distance measurement. Conventionally, there has not been such a system that performs such measurement inexpensively and accurately. For example, use of a barcode or a QR code (R) as a marker requires marker identification by causing a mobile robot to approach the marker. Accordingly, such use is unsuitable to usage for an unmanned conveyance vehicle or the like used in a factory, a distribution warehouse or the like. Increase in the size of the marker itself where a barcode or a QR code (R) is indicated can be considered as measures for improving the reading accuracy in the case where the barcode or the QR code (R) is used for an unmanned conveyance vehicle. However, such measures require a large installation place at a site, such as in a factory or a distribution warehouse. Accordingly, a problem of causing troubles in a field operation possibly occurs.

The present invention has been made in view of the problem present in the conventional art as described above, and has an object to provide an image processing device, a mobile robot control system, and a mobile robot control method that can accurately achieve identification and distance measurement even in a case of using a relatively compact marker that does not require a large installation place, and can inexpensively achieve the system. The present invention has another object to provide an image processing device, a mobile robot control system, and a mobile robot control method that can inexpensively achieve the system even in a case of using a signal emitting beacon.

Means for Solving the Problems

An image processing device in accordance with the present invention includes: a detection object including cells including first cells capable of reflecting emitted light and second cells incapable of reflecting the emitted light, the cells being squares or rectangles, the first cells and the second cells being arranged in an a×a or a×b (where a, b=3, 4, 5, 6, . . . ) matrix on a two-dimensional plane; and a detector including: an illuminator emitting light; an imager imaging, by a camera, light reflected from the first cells after the first cells and the second cells constituting the detection object are illuminated with the light emitted from the illuminator; and a calculator obtaining information set on the detection object, based on an imaged data item taken by the imager.

A mobile robot control system in accordance with the present invention includes: a driver changing a traveling speed and a traveling direction of a mobile robot; a detector detecting a plurality of detection objects placed along a traveling path to a destination; and a controller obtaining a distance and a direction to the detection object detected by the detector, calculating the traveling direction allowing the distance and the direction to the detection object to satisfy a predetermined relationship, and performing drive control of the driver, based on the calculated traveling direction, wherein the detection object is configured as a marker including first cells capable of reflecting emitted light and second cells incapable of reflecting the emitted light, the cells being squares or rectangles, the first cells and the second cells being arranged in an a×a or a×b (where a, b=3, 4, 5, 6, . . . ) matrix on a two-dimensional plane, and the detector includes: an illuminator emitting light; an imager imaging, by a camera, light reflected from the first cells after the first cells and the second cells constituting the marker are illuminated with the light emitted from the illuminator; and a calculator calculating a distance and a direction to the marker, based on an imaged data item taken by the imager.

A mobile robot control method of controlling a mobile robot in accordance with the present invention is a mobile robot control method, in which the mobile robot includes: a driver changing a traveling speed and a traveling direction of the mobile robot; a detector detecting a plurality of detection objects placed along a traveling path to a destination; and a controller obtaining a distance and a direction to the detection object detected by the detector, wherein the detection object is configured as a marker including first cells capable of reflecting emitted light and second cells incapable of reflecting the emitted light, the cells being squares or rectangles, the first cells and the second cells being arranged in an a×a or a×b (where a, b=3, 4, 5, 6, . . . ) matrix on a two-dimensional plane, and the detector includes: an illuminator emitting light; an imager imaging, by a camera, light reflected from the first cells after the first cells and the second cells constituting the marker are illuminated with the light emitted from the illuminator; and a calculator calculating a distance and a direction to the marker, based on an imaged data item taken by the imager, and the mobile robot control method includes causing the controller to calculate the traveling direction allowing the distance and the direction to the detection object to satisfy a predetermined relationship, and to perform drive control of the driver, based on the calculated traveling direction.

Effects of the Invention

The present invention can provide an image processing device, a mobile robot control system, and a mobile robot control method that can accurately achieve identification and distance measurement even in a case of using a relatively compact marker that does not require a large installation place, and can inexpensively achieve the system. Furthermore, the present invention can inexpensively achieve the system even in the case of using a signal emitting beacon.

BRIEF DESCRIPTION OF THE DRAWINGS

FIG. 8 shows an example of a table stored in a traveling path storage in accordance with this implementation example.

FIG. 16 shows an example of a table stored in a traveling path storage in accordance with the modified embodiment.

MODE FOR CARRYING OUT THE INVENTION

Preferable embodiments for implementing the present invention are hereinafter described with reference to the drawings. Note that the following embodiments do not limit the invention in accordance with each claim. Not all the combinations of characteristics described in the embodiments are necessary for means for solution of the invention.

Figure 1:
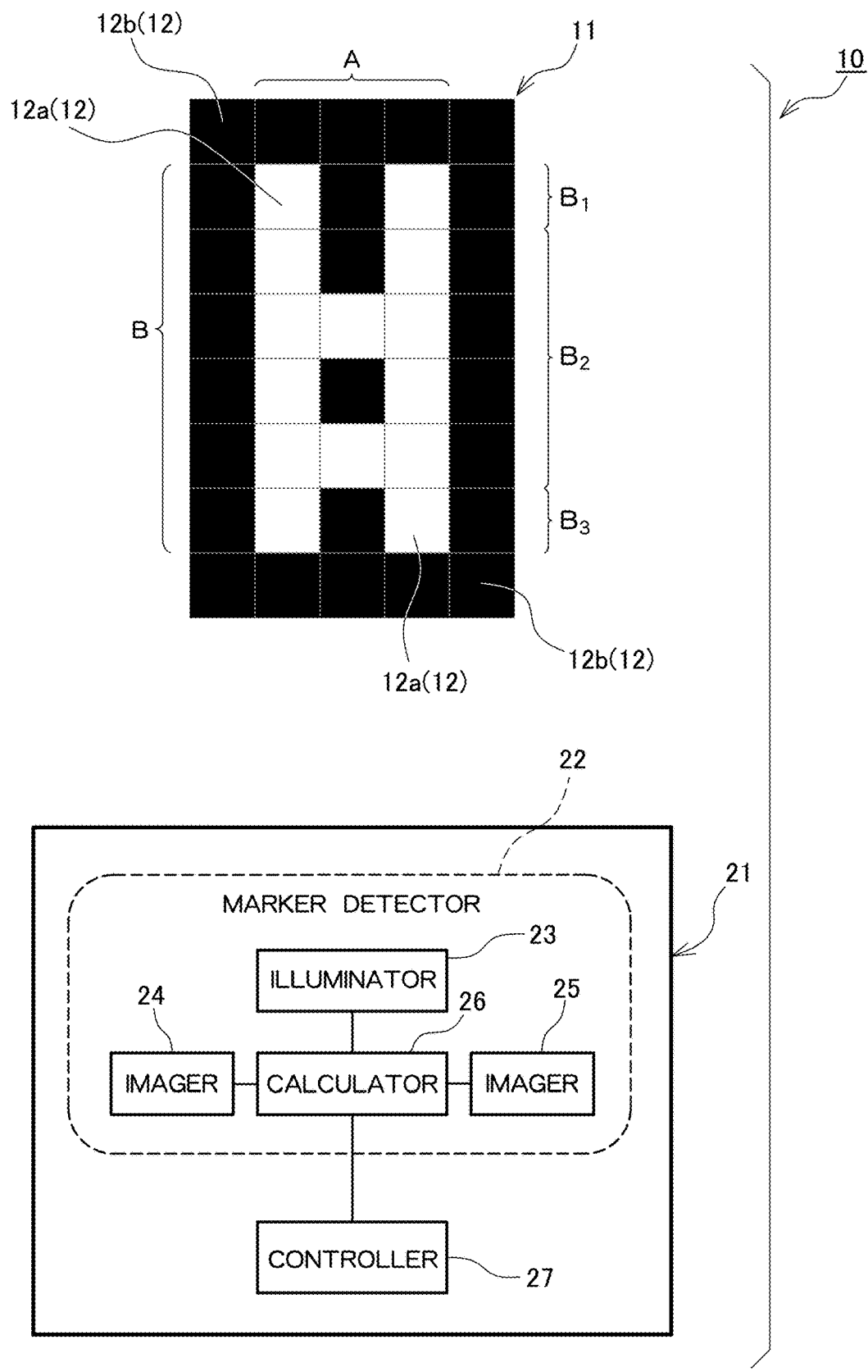
FIG. 1 is a block diagram showing a system configuration example of an image processing device in accordance with this embodiment.
Figure 2:
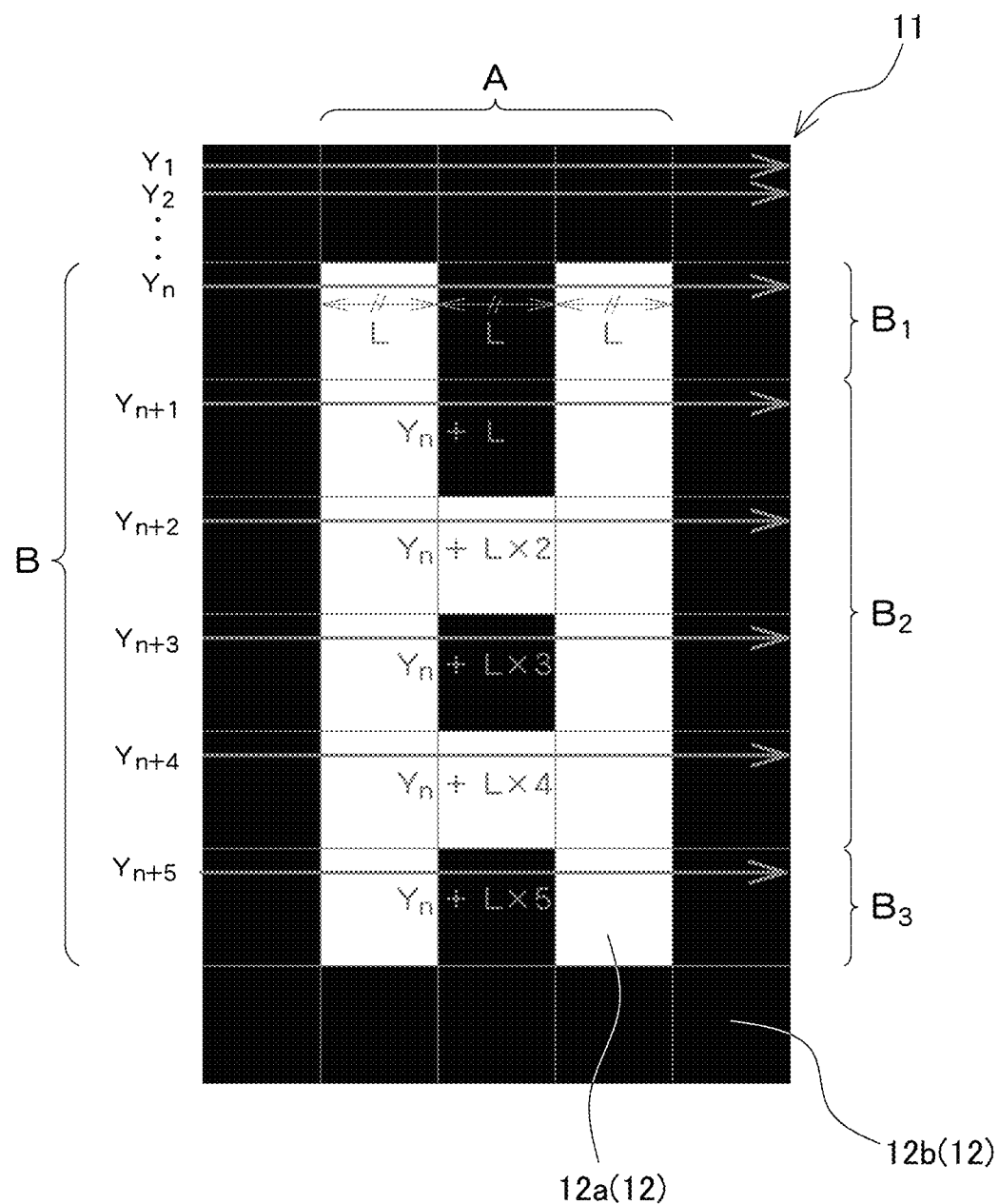
FIG. 2 illustrates a binarized image obtained by applying a binarization process to an imaged data item on a marker taken by an image processing device in accordance with this embodiment, and a scanning method for scanning the binarized image to obtain ID information set on the marker.

First, referring to FIGS. 1 and 2, a basic configuration of an image processing device in accordance with this embodiment is described. Here, FIG. 1 is a block diagram showing a system configuration example of the image processing device in accordance with this embodiment. FIG. 2 illustrates a binarized image obtained by applying a binarization process to an imaged data item on a marker taken by the image processing device in accordance with this embodiment, and a scanning method for scanning the binarized image to obtain ID information set on the marker.

As shown in FIG. 1, the image processing device 10 in accordance with this embodiment includes a marker 11 serving as a detection object, and an image processing device main body 21 that obtains desired information by reading the marker 11 and executes processes.

The marker 11 is configured by arranging multiple cells 12 made up of squares on a two-dimensional plane. The cells 12 include, for example, white cells 12a that serve as first cells capable of reflecting infrared LED light, and black cells 12b serve as second cells incapable of reflecting infrared LED light. In the case of this embodiment shown in FIG. 1, 14 white cells 12a and 26 black cells 12b are arranged on the two-dimensional plane in a five-column eight-row matrix arrangement. In this marker 11, the 22 black cells 12b arranged so as to encircle the outer periphery of the marker 11 include no information, but are a part functioning simply as a boundary for dividing the marker 11 and the space and preventing erroneous recognition of reading. That is, portions functioning as a detection object in the marker 11 shown in FIG. 1 are parts configured by a three-column six-row matrix arrangement that has eighteen cells 12 made up of three columns indicated by a symbol A and six rows indicated by a symbol B.

Among portions configured as three-column six-row matrix arrangement functioning as a detection object on the marker 11, for example, portions indicated by a symbol $B_1$ disposed on the uppermost first row are configured as "detection start position", portions indicated by a symbol $B_3$ disposed on the lowermost sixth row are configured as "detection end position", and portions indicated by a symbol $B_2$ including the second to fifth rows disposed between the detection start position $B_1$ and the detection end position $B_3$ are configured as "ID information assigning positions".

As for the detection start position $B_1$ and the detection end position $B_3$, for example, cells 12 are arranged in an order of "white, black, and white" from the left to the right on the sheet of FIG. 1. In the binary code representation of the white as "1" and the black as "0 (zero)", the positions can be indicated as "1, 0, 1". By causing the image processing device main body 21 to recognize information on "1, 0, 1", successful reading of the first row and the last row of the marker 11 can be recognized. That is, by recognizing the detection start position $B_1$ and the detection end position $B_3$ indicated by "1, 0, 1", the four-row ID information assigning positions $B_2$ residing therebetween can be correctly recognized.

As for the four-row ID information assigning positions $B_2$, cells 12 are arranged in an order of "white, black, and white", "white, white, and white", "white, black, and white", and "white, white, and white" from the upper row to the lower row. In the binary code representation thereof, these can be represented as "1, 0, 1", "1, 1, 1", "1, 0, 1", and "1, 1, 1". The information on such a three-bit four-row configuration that the marker 11 has, allows the ID information assigning positions $B_2$ to be assigned the total 12-bit ID information. The recognition of the 12-bit information by the image processing device main body 21 allows various processes to be executed.

As described above, successful reading of the detection start position $B_1$ and the detection end position $B_3$, and reading of the ID information assigning positions $B_2$ residing therebetween, allows the ID information to be obtained without erroneous recognition.

Among the cells 12, the white cells 12a are made of a material that can reflect infrared LED light emitted from an illuminator 23, described later, and allow imagers 24 and 25, described later, to image the reflected light. Aluminum foil, titanium oxide thin film or the like is adopted as the material that reflects infrared LED light. Meanwhile, the black cells 12b are made of a material that does not reflect infrared LED light emitted from the illuminator 23, described later, and cause portions for the black cells 12b in images taken by the imagers 24 and 25, described later, to be dark parts. Infrared cut film, polarizing film, infrared light absorbing material, black felt or the like is adopted as the material that does not reflect infrared LED light. That is, in this embodiment, infrared LED light emitted from the illuminator 23 serving as a light projector is reflected by the white cells 12a of the marker 11, and is received by the imagers 24 and 25 serving as light receivers, thereby taking images. At this time, the black cells 12b of the marker 11 serving as a detection object reduces the reflected light to the imagers 24 and 25 serving as the light receivers. Accordingly, what is called a retro-reflective image obtaining configuration that detects reduction in the amount of reflection is adopted.

The image processing device main body 21 in accordance with this embodiment includes a marker detector 22, and a controller 27. Furthermore, the marker detector 22 includes an illuminator 23, two imagers 24 and 25, and a calculator 26.

The illuminator 23 can illuminate the marker 11 with infrared LED light, and is used to allow the imagers 24 and 25 to read reflected light reflected by the marker 11. The infrared LED light emitted from the illuminator 23 allows the marker 11 to be imaged even at a dark place, such as in a factory, at a place with strong visible light.

The two imagers 24 and 25 are made up of two cameras arranged at the left and right of the marker detector 22. These two imagers 24 and 25 allow the two cameras to take images of light emitted from the illuminator 23 to the white cells 12a and black cells 12b, which constitute the marker 11, and subsequently reflected by the white cells 12a. Note that the two imagers 24 and 25 respectively take independent images. Imaged data items obtained using the two imagers 24 and 25 are transmitted to the calculator 26.

The calculator 26 performs computation through triangulation on the basis of the imaged data items transmitted from the two imagers 24 and 25 to allow calculation of the distance (relative distance) and direction (relative angle) of the marker 11 with respect to the image processing device main body 21.

Here, the scanning and computation method by the calculator 26 is described with reference to FIG. 2. After obtaining the imaged data items taken by the two imagers 24 and 25 from these two imagers 24 and 25, the calculator 26 applies the binarization process to the obtained imaged data items and obtains a binarized image shown in FIG. 2. Note that on the stage of this binarization process, the reflected light of the infrared LED light reflected by the white cells 12a, and portions where no reflection is made by the black cells 12b are clarified by a black-and-white binarization process.

Furthermore, the calculator 26 scans the binarized image obtained by the binarization process, in the horizontal direction from the upper left to the right on the sheet of FIG. 2. The situation of a scan executed first is indicated by a symbol $Y_1$. Here, the first scan $Y_1$ detects only black cells 12b. Accordingly, the recognition result thereof is "black", and is a detection result only with "0" represented in the binary code. In this case, it can be recognized that the first scan cannot detect the detection start position $B_1$. Accordingly, at a position indicated by a symbol $Y_2$ translated downward from the binarized image by a preset dimension, a second scan is executed. In the example of FIG. 2, the second scan $Y_2$ also detects only black cells 12b. Accordingly, the recognition result thereof is "black", and is a detection result only with "0" represented in the binary code. That is, it can be recognized that the second scan cannot detect the detection start position $B_1$. Accordingly, the scanning is further translated downward in the binarized image by the preset dimension, and is continued.

The calculator 26 continues scanning according to the procedures described above. When an n-th scan $Y_n$ is executed, white cells 12a are detected at the first time, and the recognition result thereof is "white, black, and white", and information "1, 0, 1" represented in the binary code is obtained. At this time, the calculator 26 can recognize the detection of the detection start position $B_1$. Furthermore, at this time, the calculator 26 can calculate the dimensions of the cells 12 recognized as "white, black, and white" on the binarized image. For example, as shown in FIG. 2, it can be confirmed that the dimensions of the cells 12 recognized as "white, black, and white" are each L. In this embodiment, it is preliminarily obvious that the cells 12 are squares. Accordingly, it can be recognized that the dimensions of the white cells 12a and black cells 12b, which constitute the marker 11 in accordance with this embodiment, are each a square having dimensions of L×L.

For executing $Y_{n+1}$ that is the (n+1)-th scan, the calculator 26, which has executed $Y_n$ that is the n-th scan to detect the detection start position $B_1$, executes the scan $Y_{n+1}$ at a position $Y_n+L$ translated downward from the n-th scan position by a dimension L. That is, the calculator 26 recognizes the detection start position $B_1$ by the n-th scan, and can recognize the position of the first row of the four-row ID information assigning positions $B_2$ that is a portion to be scanned next, by calculating the coordinates on the binarized image. Accordingly, one scan is performed while moving the scan position to the position concerned, thereby allowing a scan $Y_{n+1}$ to be executed for the first row of the four-row ID information assigning positions $B_2$. Note that for execution of the scan $Y_{n+1}$, to secure a margin for the scan position, the scan $Y_{n+1}$ may be executed at the position of $Y_n+(L+s)$ translated downward in the binarized image from the n-th scan position by a slight dimension (L+s) obtained by adding a slight dimension s to the dimension L. Adoption of such control can facilitate improvement in scan accuracy.

Similar to the aforementioned scan $Y_{n+1}$ for the first row, the second to fifth rows of the four-row ID information assigning positions $B_2$ are subsequently scanned in the sequential order of scans $Y_{n+2}/Y_{n+3}$ and $Y_{n+4}$, which can obtain the ID information set to the entire four-row ID information assigning positions $B_2$ by executing one scan for each row. That is, for execution of $Y_{n+2}$ that is the (n+2)-th scan, a scan $Y_{n+2}$ is executed at a position $Y_n+L\times2$ translated downward in the binarized image from the n-th scan position by the dimension 2L. For execution of $Y_{n+3}$ that is the (n+3)-th scan, a scan $Y_{n+3}$ is executed at a position $Y_n+L\times3$ translated downward in the binarized image from the n-th scan position by the dimension 3L. For execution of $Y_{n+4}$ that is the (n+4)-th scan, a scan $Y_{n+4}$ is executed at a position $Y_n+L\times4$ translated downward in the binarized image from the n-th scan position by the dimension 4L. Note that in FIG. 2, as for the four-row ID information assigning positions $B_2$, cells 12 are arranged in an order of "white, black, and white", "white, white, and white", "white, black, and white", and "white, white, and white" from the upper row. In the binary code representation thereof, these can be represented as "1, 0, 1", "1, 1, 1", "1, 0, 1", and "1, 1, 1". The calculator 26 thus obtains such information from the four-row ID information assigning positions $B_2$.

Furthermore, according to a scan $Y_n+5$ executed after the scan $Y_{n+4}$, at a position of $Y_n+L\times5$ translated downward in the binarized image from the n-th scan position by the dimension 5L, the scan $Y_n+5$ is executed, which obtains a recognition result of "white, black, and white", and obtains information on "1, 0, 1" represented in the binary code. At this time, the calculator 26 preliminarily recognizes that this scan $Y_{n+5}$ is the fifth scan after detection of the detection start position $B_1$, and the position concerned is the detection end position $B_3$. Information detected by the scan $Y_{n+5}$ is "1, 0, 1". This information coincides with information indicating the detection end position $B_3$. Accordingly, it can be recognized that the scans $Y_1$ to $Y_{n+5}$ are normally executed and finished.

The scan procedures described above allows the calculator 26 to obtain correctly the ID information set on the marker 11. Note that for example, if the detection start position $B_1$ or the detection end position $B_3$ cannot be obtained in the aforementioned operation procedures, there is a possibility that the imaged data items transmitted from the two imagers 24 and 25 partially lack or are defective. Accordingly, an operation procedure for obtaining imaged data items from the two imagers 24 and 25 again is executed. If there are multiple pairs of imaged data items taken by the two imagers 24 and 25, the calculator 26 may be caused to execute a process of selecting the marker 11 to be adopted at the current time on the basis of the obtained ID information.

As for means for facilitating improvement in scan accuracy, for execution of scans $Y_{n+2}$, $Y_{n+3}$, $Y_{n+4}$ and $Y_{n+5}$, in order to secure a margin for the scan position, through the respective scans, a scan $Y_{n+2}$ may be executed at a position of $Y_n+L\times2+S$ translated downward in the binarized image from the n-th scan position, $Y_{n+3}$ may be executed at a position of $Y_n+L\times3+s$, $Y_{n+4}$ may be executed at a position of $Y_n+L\times4+s$, and $Y_{n+5}$ may be executed at a position of $Y_n+L\times5+s$.

According to the scan procedures described above, the example of the embodiment has been described that recognizes the detection start position $B_1$, subsequently scans the second to fifth rows of the four-row ID information assigning positions $B_2$, and lastly scans the detection end position $B_3$. However, the order of scans performed by the calculator 26 is not limited to that described above. For example, after recognition of the detection start position $B_1$, the second to fifth rows of the four-row ID information assigning positions $B_2$ are skipped but the detection end position $B_3$ is scanned, the detection start position $B_1$ and the detection end position $B_3$ may thus be securely detected first, and then the second to fifth rows of the four-row ID information assigning positions $B_2$ may be scanned. Execution of such scan procedures can securely detect that the obtained image data indicates the marker 11, and further facilitate reduction in processing time for noise, such as an image other than the marker 11.

Note that in the marker 11 shown in FIGS. 1 and 2, the 22 black cells 12b including no information are arranged so as to encircle the outer periphery of the marker 11. The 22 black cells 12b arranged on the outer periphery not only functions as a boundary with the three-column six-row 18 cells 12 including the information arranged therein, but also exerts a function of improving the detection accuracy of the three-column six-row 18 cells 12 that absorb light from the outside and includes the information arranged therein. In particular, in an environment where the marker 11 is backlit in view from the imagers 24 and 25, the 22 black cells 12b arranged on the outer periphery absorb excessive light, and can suppress reflection and inclusion of the excessive light to the three-column six-row 18 cells 12 including the information arranged therein. Such a configuration can achieve an advantageous effect of stably detecting the marker 11 by the image processing device main body 21.

The calculator 26 having obtained the ID information can transmit the information to the controller 27. The controller 27 having received the information transmitted from the calculator 26 can execute various types of control using the ID information; the control includes operating a mechanism added to the image processing device main body 21, and executing an operation instruction to the outside. As an operation example thereof, for example, controlling the operation of a driver that changes the traveling speed and the traveling direction of a mobile robot used in a factory, a distribution warehouse or the like, can be assumed.

Figure 3:
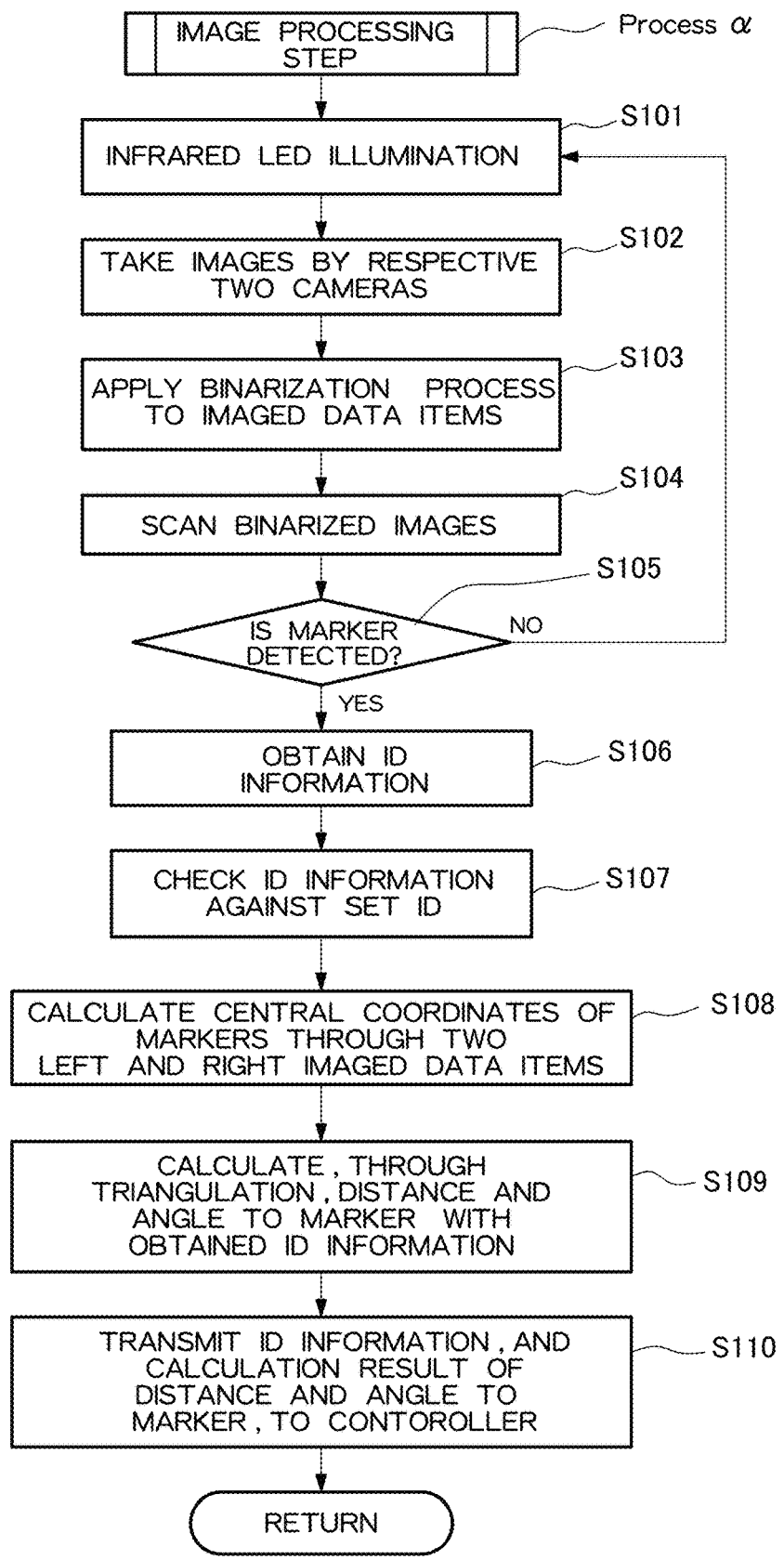
FIG. 3 is a flowchart showing an image processing step for illustrating operations of the image processing device in accordance with this embodiment.

Referring to FIGS. 1 and 2, the basic configuration of the image processing device 10 in accordance with this embodiment has thus been described. Next, additionally referring to FIG. 3, the operations of the image processing device 10 in accordance with this embodiment is described. Here, FIG. 3 is a flowchart showing an image processing step for illustrating the operations of the image processing device in accordance with this embodiment.

By operating the image processing device 10 in accordance with this embodiment, in the executed image processing step (Process α), first, the illuminator 23 illuminates the marker 11 with infrared LED light (step S101). As for the infrared LED emitted to the marker 11 from the illuminator 23, light emitted to the black cells 12b among the cells 12 constituting the marker 11 is not reflected, while only light emitted to the white cells 12a is reflected as reflected light to the image processing device main body 21. The light reflected by the white cells 12a is imaged by the two imagers 24 and 25 made up of the two cameras (step S102). At this time, the imagers 24 and 25 each take one imaged data item. After execution of the process of step S102, the two imaged data items taken by the respective two imagers 24 and 25 are transmitted to the calculator 26.

After obtaining the imaged data items taken by the two imagers 24 and 25 from these two imagers 24 and 25, the calculator 26 applies the binarization process to the obtained imaged data items and obtains a binarized image shown in FIG. 2 (step S103).

Furthermore, the calculator 26 executes a scan described with reference to FIG. 2 for the binarized image obtained by the binarization process (step S104). Note that the efficient scan procedures performed by the calculator 26 have been described above. Accordingly, the description is omitted here.

If through the scan by the calculator 26 for the binarized image, all the detection start position $B_1$, the four-row ID information assigning positions $B_2$, and the detection end position $B_3$ are normally recognized by the calculator 26, it is determined that the marker 11 is detected, and the processing proceeds to YES in step S105. On the contrary, if any one of the detection start position $B_1$, the four-row ID information assigning positions $B_2$, and the detection end position $B_3$ cannot recognized by the calculator 26, the processing proceeds to NO in step S105. That is, if the marker 11 cannot be detected, the processing returns to step S101 and re-executed.

If the marker 11 is successfully detected and the processing proceeds to YES in step S105, the calculator 26 subsequently obtains the ID information on the basis of information from the four-row ID information assigning positions $B_2$ (step S106).

The calculator 26 having obtained the ID information checks the information against the set ID, thereby selecting the marker 11 to be associated with the ID information and determining one piece of ID information (step S107). At this time, if multiple pieces of ID information have been obtained, for the process of step S107, the marker 11 associated with the piece of ID information to be adopted at the current time from among the pieces of ID information is selected, thereby one piece of ID information is determined (step S107). Note that for example, a method of selecting the ID information set at the ID information assigning positions $B_2$ of the marker 11 having the smallest number among the identification numbers assigned to the respective markers 11 can be considered as the method of selecting one piece of ID information from among the pieces of ID information.

After the ID is checked in the process of step S107 to select the marker 11 to be associated with the ID information, the central coordinates of the marker 11 are calculated through the left and right imaged data items obtained by the two left and right imagers 24 and 25 imaging the marker 11 are calculated (step S108).

The calculator 26 executes an operation based on triangulation, using the central coordinates of the marker 11 calculated by the process of step S108 on each of the left and right imaged data items, and calculates the distance and the angle to the marker 11 with the obtained ID information (step S109). Furthermore, the calculator 26 transmits the obtained ID information, and a calculation result of the distance and angle to the marker 11 calculated based on the ID information, to the controller 27 (step S110). These processes from step S101 to step S110 are executed, and the image processing step (Process α) in accordance with this embodiment is finished.

Execution of the image processing step (Process α) in accordance with this embodiment described above allows the calculator 26 to obtain correctly the ID information set on the marker 11. Although the preferable embodiments of the image processing device in accordance with the present invention have thus been described above, the technical scope of the present invention is not limited to the scope described in the aforementioned embodiment. The embodiments can be variously changed or modified.

Figure 4:
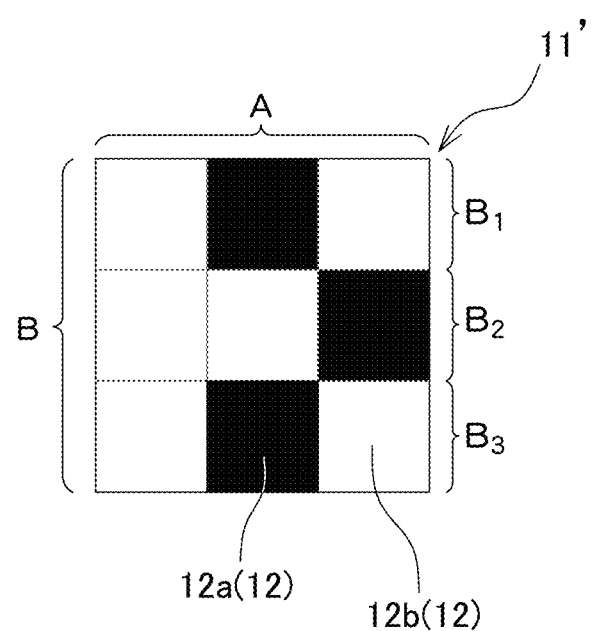
FIG. 4 shows an example of various modes in which the marker can be embodied.

For example, in the image processing device 10 according to the embodiment described above, in the marker 11, the 14 white cells 12a and the 26 black cells 12b are arranged on a two-dimensional plane in five-column eight-row matrix arrangement. This marker 11 is provided with the 22 black cells 12b arranged so as to encircle the outer periphery of the marker 11. However, these 22 black cells 12b include no information, but are a part functioning simply as a boundary for dividing the marker 11 and the space and preventing erroneous recognition of reading. That is, portions functioning as the detection object in the marker 11 shown in FIG. 1 are parts configured by the three-column six-row matrix arrangement that has eighteen cells 12 made up of three columns indicated by a symbol A and six rows indicated by a symbol B. However, the mode of the marker in accordance with the present invention is not limited to that shown in FIG. 1, and may be changed in any manner. For example, the 22 black cells 12b arranged so as to surround the outer periphery of the marker 11 can be omitted. As for the number of cells 12 constituting the marker in accordance with the present invention, any mode can be adopted that is, for example, what includes the matrix arrangement of three-column three-row nine cells 12 as exemplified in FIG. 4. Incidentally, FIG. 4 shows an example of various modes adoptable by the marker in accordance with the present invention. In the case of the marker 11' shown in FIG. 4, the ID information assigning position $B_2$ includes one row, and information with a three-bit configuration can be included in the marker 11'.

For example, in the image processing device 10 in accordance with the embodiment described above, the cells 12 constituting the marker 11 are each made up of a square. Alternatively, a rectangular shape, such as a rectangle, is adoptable as the cell of the present invention. If the shape of the cell is preliminarily known, the processes of scans, computation and the like described in the aforementioned embodiment can be analogously executed.

That is, the marker as the detection object in accordance with the present invention can be achieved by arranging the cells 12 that are squares or rectangles and include the white cells 12a capable of reflecting infrared LED light and the black cells 12b incapable of reflecting the infrared LED light, in an a×a or a×b (where a, b=3, 4, 5, 6, . . . ) matrix on a two-dimensional plane.

For example, for the image processing device 10 in accordance with the embodiment described above, the case where infrared LED light is used as the light emitted from the illuminator 23 has been exemplified. However, the light used in the present invention is not limited to infrared LED light. Alternatively, use of light with other wavelengths, such as ultraviolet light, or light from a light source other than the LED can also achieve advantageous effects similar to those of the embodiment described above.

For example, in the image processing device 10 in accordance with the embodiment described above, the imager in accordance with the present invention includes imagers 24 and 25 made up of two cameras, thereby executing the computation process through triangulation based on the two imaged data items. However, the imager in accordance with the present invention is only required to perform imaged data processing similar to that of the embodiment described above. For example, the imager in accordance with the present invention may include cameras where one lens is provided for one camera. Alternatively, the imager in accordance with the present invention may include a radio camera where two lenses are included in one camera.

For example, in the image processing device 10 in accordance with the embodiment, the imagers 24 and 25 including two cameras, and the illuminator 23 emitting infrared LED light are separately configured. Alternatively, the illuminator and the imager in accordance with the present invention may be a device where the illuminator and the imager are integrally configured.

For example, in the image processing device 10 in accordance with the embodiment described above, the imaged data items taken by the two imagers 24 and 25 are subjected to the binarization process by the calculator 26. However, the scope of the present invention is not limited to this example. For example, a device configuration and processing procedures may be adopted where each of the two imagers 24 and 25 has an image processing function that is a function similar to that of the calculator 26 described above, the imagers 24 and 25 image infrared LED light reflected from the marker 11, these imagers 24 and 25 immediately perform the binarization process, and transmits, to the calculator 26, the image data on the binarized image having been subjected to the binarization process.

For example, in the image processing device 10 in accordance with the embodiment described above, the marker detector 22 is provided with the calculator 26. The calculator 26 is caused to obtain the ID information and to calculate the distance and angle to the marker 11 on the basis of the ID information, and the calculation result is transmitted to the controller 27. However, the configuration where the calculator 26 and the controller 27 are separately configured is only an example. These components may be separated from each other, be configured by a single microprocessor, or be disposed outside of the image processing device main body 21, and the calculator 26 and the controller 27 may be connected to the image processing device main body 21 wirelessly or via an Internet line.

For example, in the image processing device 10 in accordance with the embodiment described above, the calculator 26 scans the binarized image obtained by the binarization process, in the horizontal direction from the upper left to the right on the sheet of FIG. 2. However, the direction of scanning the binarized image performed by the calculator 26 is not limited to the horizontal direction. A process of scanning in the vertical direction may be adopted.

According to the description of Claims, it is obvious that such variously changed or modified modes can also be included in the technical scope of the present invention.

The basic configuration and operations of the image processing device 10 in accordance with this embodiment have thus been described. Next, an implementation example in a case of applying the image processing device 10 in accordance with the embodiment described above to a mobile robot used in a factory or a distribution warehouse is described. Note that in the implementation embodiment described below, components and steps identical or similar to those in the embodiment described above are assigned the same symbols, and the description is omitted in some cases.

Figure 5:
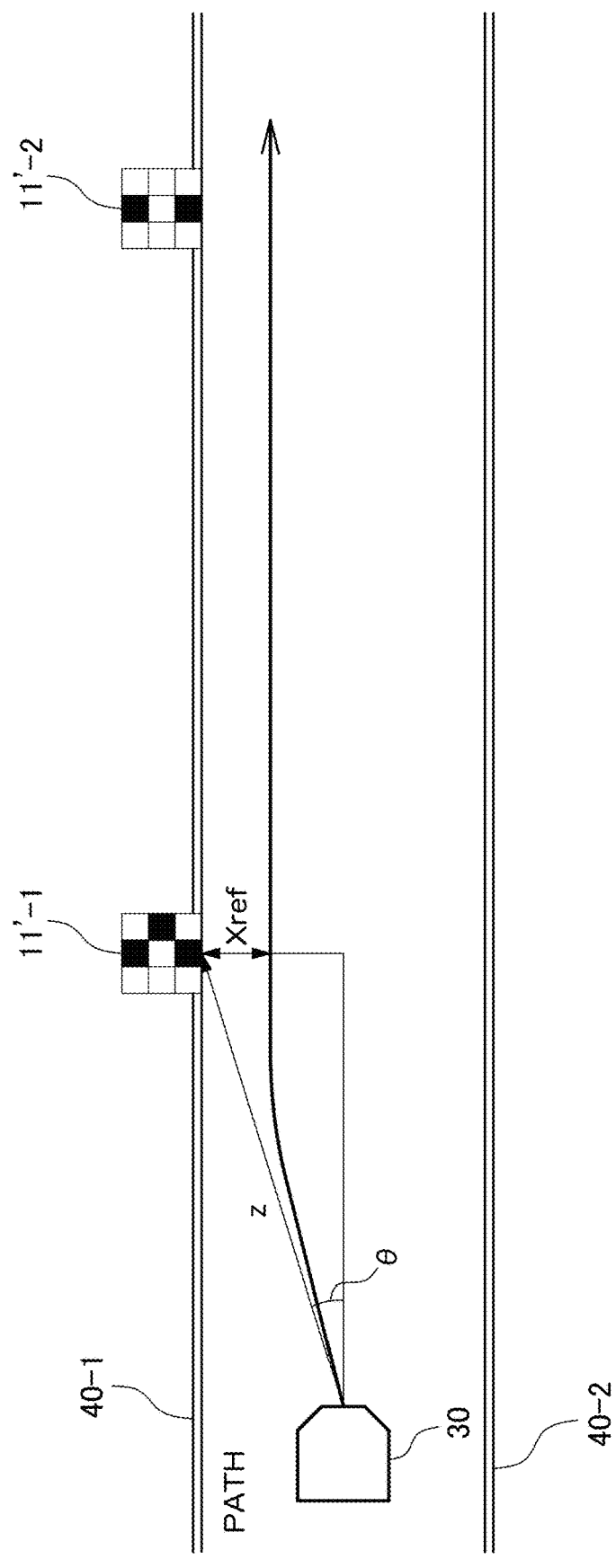
FIG. 5 illustrates a traveling example of a mobile robot in accordance with this implementation example.

FIG. 5 illustrates a traveling example of a mobile robot in accordance with this implementation example. The mobile robot 30 detects a marker 11' (11'-1) that serves as a detection object and is placed along a boundary 40 (40-1, 40-2) defining a pathway, and travels toward the destination while keeping a constant distance from the boundary 40, on the basis of the position of the detected marker 11'. The marker 11' used in this implementation example is assumed to be what is installed so as to face the mobile robot 30 and includes a matrix arrangement with three columns and three rows and nine cells 12 exemplified in FIG. 4. This marker 11' includes only one row of ID information assigning position $B_2$, and allows the marker 11' to have information with a three-bit configuration. The ID information set on the marker 11' is assigned a marker ID for uniquely identifying each marker 11'. Note that the boundary 40 defining the pathway is, for example, a wall, a partition, white line or the like.

In the traveling example shown in FIG. 5, the mobile robot 30 travels while maintaining a constant distance from the left boundary 40-1 with respect to the traveling direction of the mobile robot 30. To maintain the constant distance Xref from the boundary 40-1, the mobile robot 30 obtains the distance Z and direction θ to the detected marker 11'-1, and calculates the traveling direction where the distance Z and the direction θ satisfy a predetermined condition. The mobile robot 30 travels the calculated traveling direction. The direction θ is an angle between the traveling direction of the mobile robot 30 and the direction of the detected marker 11'-1. The traveling direction satisfying the predetermined condition is a traveling direction where the direction θ is arcsin(Xref/Z). When the distance Z to the marker 11'-1 becomes shorter than a predetermined switching threshold, the mobile robot 30 switches the target to the marker 11'-2 and travels. The range having distances from the mobile robot 30 shorter than the switching threshold is called a switching range.

Figure 6:
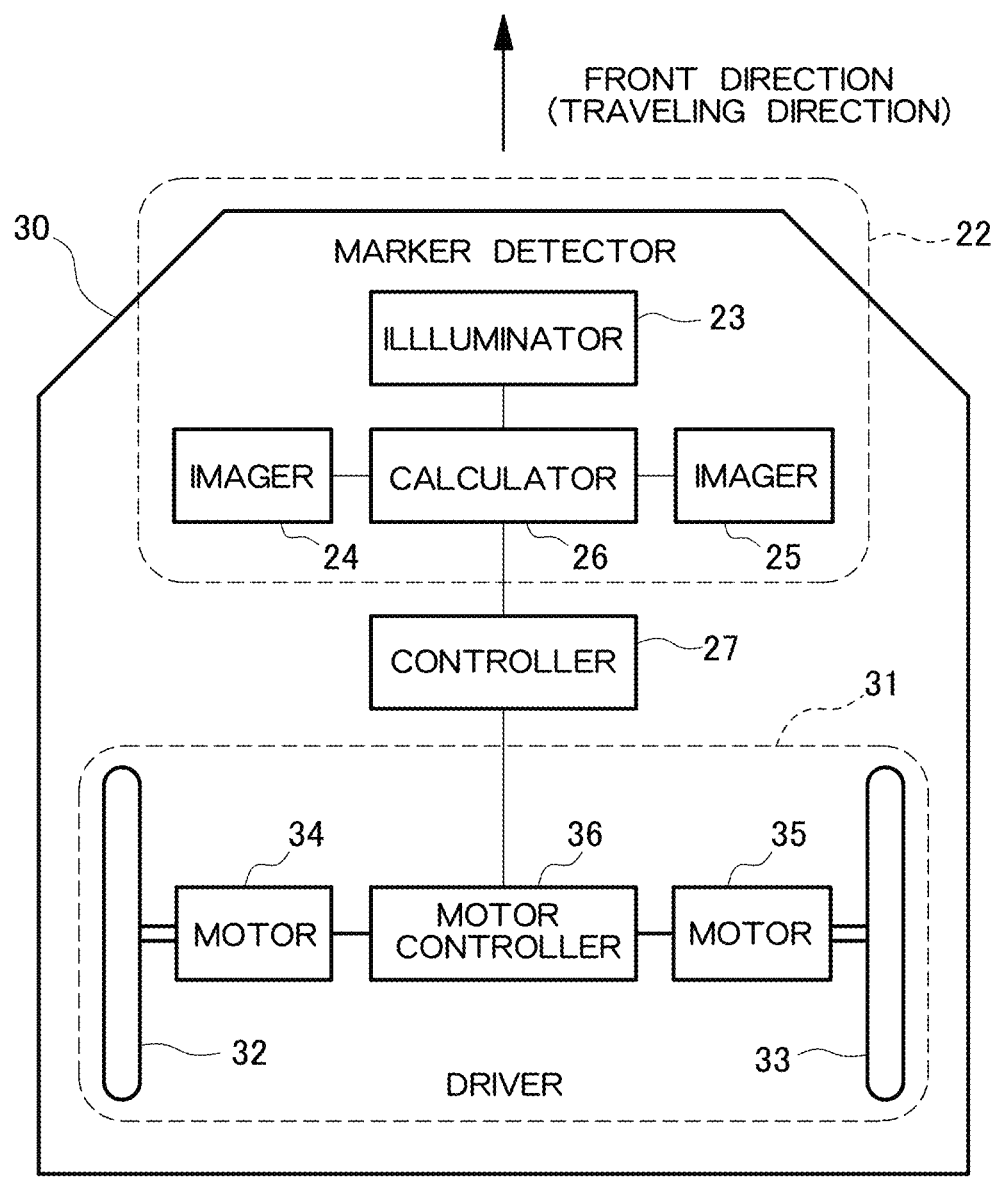
FIG. 6 is a block diagram showing a configuration example of the mobile robot in accordance with this implementation example.

Next, referring to FIG. 6, a specific configuration example of the mobile robot 30 in accordance with this implementation example is described. Here, FIG. 6 is a block diagram showing the configuration example of the mobile robot in accordance with this implementation example. The mobile robot 30 in accordance with this implementation example includes a driver 31, a marker detector 22, and a controller 27.

The driver 31 includes drive wheels 32 and 33, motors 34 and 35, and a motor controller 36. The drive wheel 32 is provided to the left with respect to the traveling direction of the mobile robot 30. The drive wheel 33 is provided to the right with respect to the traveling direction of the mobile robot 30. The motor 34 drives the drive wheel 32 according to the control by the motor controller 36. The motor 35 drives the drive wheel 33 according to the control by the motor controller 36. The motor controller 36 supplies power to the motors 34 and 35 on the basis of angular rate instruction values to the respective motors 34 and 35 input from the controller 27.

The motors 34 and 35 are rotated at angular rates according to powers supplied by the motor controller 36, thereby allowing the mobile robot 30 to travel forward or backward. By causing a difference between the angular rates of the motors 34 and 35, the traveling direction of the mobile robot 30 is changed. For example, by causing the angular rate of the left drive wheel 32 to be higher than the angular rate of the right drive wheel 33, the mobile robot 30 travels while turning clockwise. By rotating the drive wheels 32 and 33 in directions opposite to each other, the mobile robot 30 turns without changing the position. Note that to stabilize the attitude of the mobile robot 30, the mobile robot 30 may include wheels other than the drive wheels 32 and 33.

The marker detector 22 includes an illuminator 23, two imagers 24 and 25, and a calculator 26.

The illuminator 23 is attached, for example, at the central position on the front surface of the mobile robot 30, and can illuminate the marker 11' with infrared LED light, and is used to allow the imagers 24 and 25 to read reflected light reflected by the marker 11'. The infrared LED light emitted from the illuminator 23 is preferable because the marker 11 can be imaged even at a dark place, such as in a factory, at a place with strong visible light.

The two imagers 24 and 25 are made up of two cameras arranged at the left and right of the marker detector 22. The imager 24 is attached on the left side on the front surface of the mobile robot 30, and detects and images infrared LED light reflected by the marker 11' disposed toward the front of the mobile robot 30. The imager 25 is attached on the right side on the front surface of the mobile robot 30, and detects and images infrared LED light reflected by the marker 11' disposed toward the front of the mobile robot 30. The imagers 24 and 25 are attached to a housing of the mobile robot 30 symmetrically with respect to the line in the front direction passing through the center of the mobile robot 30. For example, cameras where infrared filters are combined are used as the imagers 24 and 25. These two imagers 24 and 25 are components that can obtain imaged data items by allowing the two cameras to take images of light emitted from the illuminator 23 to the white cells 12a and black cells 12b, which constitute the marker 11, and subsequently reflected by the white cells 12a. The imaged data items obtained using the two imagers 24 and 25 are transmitted to the calculator 26.

The calculator 26 forms black-and-white binarized image data on the basis of the imaged data items transmitted from the two imagers 24 and 25, and further performs computation through triangulation using the binarized imaged data items, thereby allowing calculation of the distance (distance Z) and the direction (angle θ) of the marker 11' with respect to the mobile robot 30. When multiple markers 11' are included in images taken by the imagers 24 and 25, the calculator 26 detects the marker ID and selects a target marker 11', and calculates the distance Z and the angle θ to the target marker 11'. The marker ID is detected by obtaining information set at one row of the ID information assigning position $B_2$ provided on the marker 11'. The calculator 26 outputs, to the controller 27, the marker information including the calculated distance Z and direction θ. The calculated distance Z is a distance from the center of a line segment connecting the imager 24 and the imager 25. If the line segment connecting the imager 24 and the imager 25 is attached so as to be orthogonal to the traveling direction of the mobile robot 30, computation load on the calculator 26 can be reduced.

Figure 7:
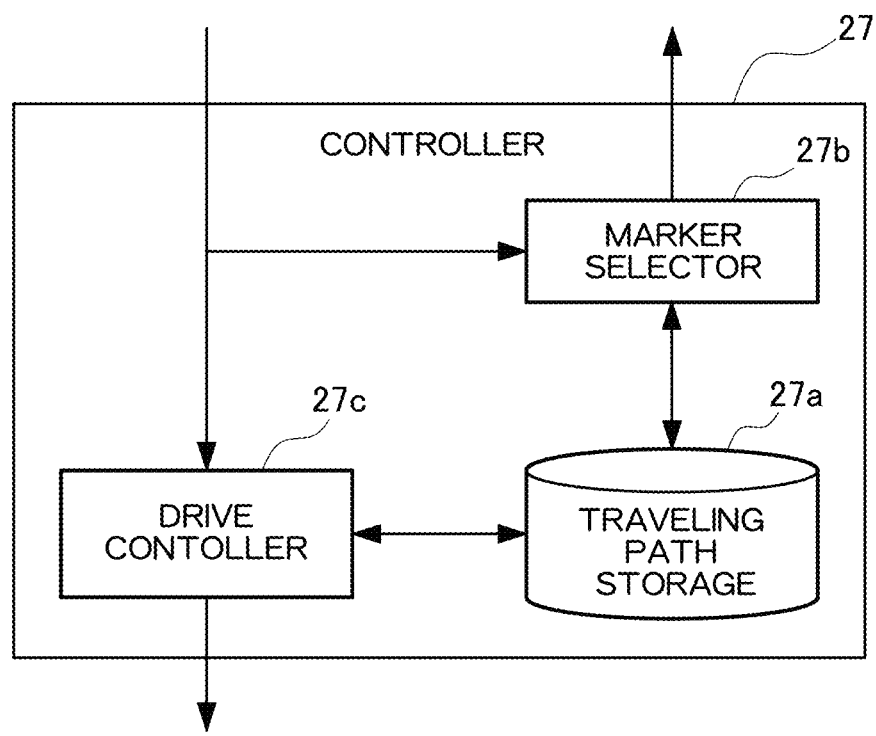
FIG. 7 is a block diagram showing a configuration example of a controller in accordance with this implementation example.

The controller 27 controls the driver 31 on the basis of the marker information obtained from the marker detector 22. FIG. 7 is block diagram showing a configuration example of the controller in accordance with this implementation example. The controller 27 in accordance with this implementation example includes a traveling path storage 27a, a marker selector 27b, and a drive controller 27c. The traveling path storage 27a preliminarily stores attribute information pertaining to multiple markers 11' placed along the traveling path of the mobile robot 30. The marker selector 27b outputs the marker ID of the target marker 11' to the marker detector 22 on the basis of a table stored in the traveling path storage 27a. The marker selector 27b determines whether to switch the target marker 11' or not on the basis of the marker information input from the marker detector 22. For switching the target marker 11', the marker selector 27b selects the next marker 11' of the current target marker 11' from the table.

The drive controller 27c reads the attribute information and control information from the table stored in the traveling path storage 27a, on the basis of the marker information output from the marker detector 22. The attribute information is information pertaining to the target marker 11'. The control information is information indicating control associated with the target marker 11'. The control associated with the marker 11' is control for turning in proximity to the marker 11' indicating the change of the traveling direction, for example. The drive controller 27c performs drive control of the driver 31 on the basis of the marker information, the attribute information, and the control information.

FIG. 8 shows an example of the table stored in the traveling path storage in accordance with this implementation example. The table includes columns of items of "MARKER ID", "PATHWAY DISTANCE", "PLACEMENT SIDE", "DIRECTION SWITCHING" and "LAST MARKER". The rows indicate pieces of attribute information that are for the respective markers 11'. The rows of the table are arranged in an order of the markers 11' by which the mobile robot 30 travels along the traveling path. The column of "MARKER ID" includes the marker IDs of the markers 11' corresponding to the respective rows. The column of "PATHWAY DISTANCE" includes distance information indicating the distances between the markers 11' corresponding to the respective rows and the traveling path of the mobile robot 30. The pathway distance is a value set as a positive value, and is a value indicating the distance from the target marker 11' to traveling path of the mobile robot 30. In this implementation example, the pathway distance indicates the distance from the marker 11' to the destination residing at a position in a direction substantially orthogonal to the traveling direction on the traveling path of the mobile robot 30.

The column of "PLACEMENT SIDE" includes information indicating whether the marker 11' corresponding to the row is placed to the right or left of the mobile robot 30 when the mobile robot 30 travels along the traveling path. The column of "DIRECTION SWITCHING" includes turning information indicating the change of the traveling direction of the mobile robot 30 when the mobile robot 30 reaches the predetermined distance or the switching threshold with respect to the marker 11' corresponding to the row. A case where the turning information is 0 (zero) degrees indicates that the traveling direction of the mobile robot 30 is not changed. In cases where the turning information is other than 0 degrees, the traveling direction of the mobile robot 30 is changed clockwise or counterclockwise by a degree indicated by the turning information. The column of "LAST MARKER" includes information indicating whether or not the marker 11' corresponding to the row is the marker 11' indicating the destination on the traveling path. The table shown in FIG. 8 indicates that the marker 11' having the marker ID "M" is the marker at the destination, for example. In this example, the number of markers 11' indicating destinations is one.

Figure 9:
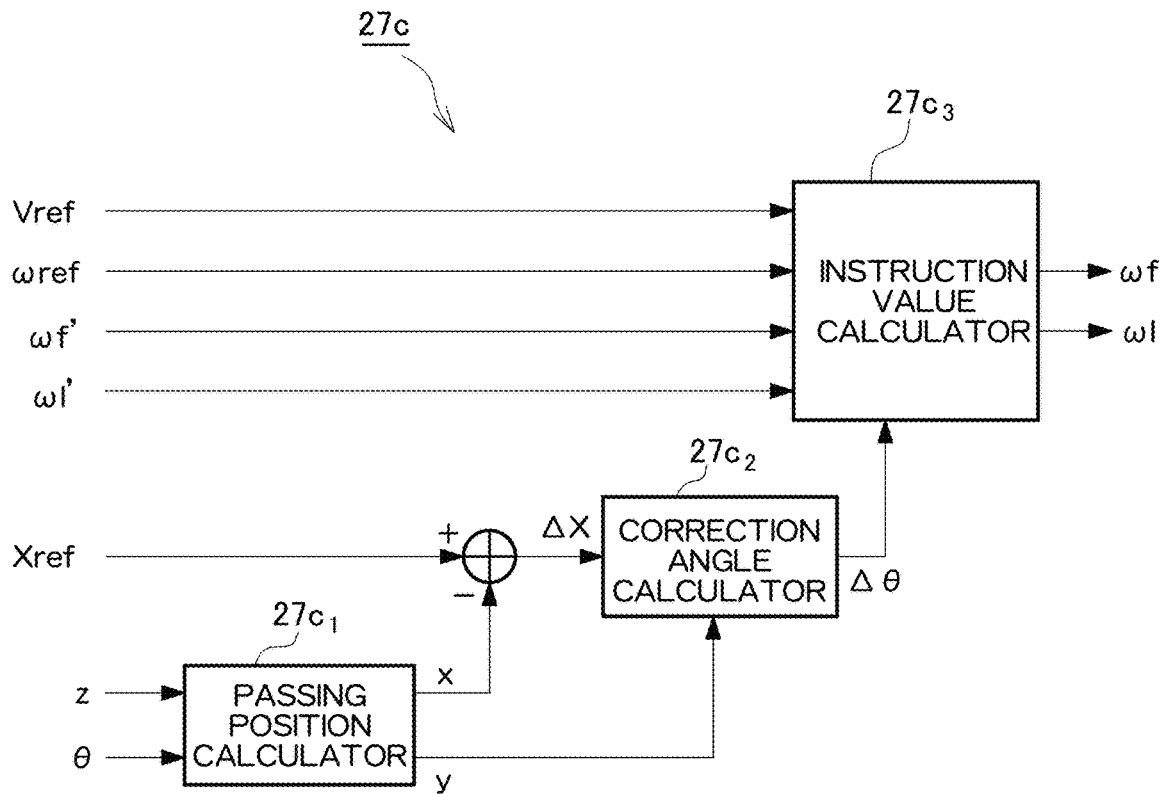
FIG. 9 is a block diagram showing a configuration example in accordance with control based on marker information in a drive controller in accordance with this implementation example.

FIG. 9 is a block diagram showing a configuration example in accordance with control based on the marker information in the drive controller in accordance with this implementation example. The drive controller 27c includes a passing position calculator $27c_1$, a correction angle calculator $27c_2$, and an instruction value calculator $27c_3$. The passing position calculator $27c_1$ receives the distance Z and the direction θ to the marker 11' included in the marker information. The passing position calculator $27c_1$ calculates the distance x to the marker 11' in a case of moving in the current traveling direction of the mobile robot 30 and approaching the marker 11' in the closest manner, and the traveling distance y until closest approach to the marker 11', on the basis of the distance Z and the direction θ The position in the case where the mobile robot 30 approaches the marker 11' in the closest manner is the intersection between the line that is orthogonal to the traveling line extending from the position of the mobile robot 30 in the traveling direction and passes the position of the marker 11', and the traveling line. The distance x is obtained as (Z·sin θ). The traveling distance y is obtained as (Z·cos θ). The distance x is also called a marker passing distance. The traveling distance y is also called a distance to what is lateral to the marker.

The correction angle calculator $27c_2$ receives the difference ΔX obtained by subtracting the distance x from the distance Xref from the boundary of the pathway to the traveling path and the traveling distance y. The correction angle calculator $27c_2$ calculates the correction angle Δθ to the traveling direction of the mobile robot 30 on the basis of the difference ΔX and the traveling distance y. Specifically, the correction angle calculator $27c_2$ adopts a value obtained by arctan(ΔX/y) as the correction angle Δθ.

The instruction value calculator $27c_3$ receives a translation velocity instruction value Vref, an angular rate instruction value ωref, angular rate measured values ωl' and ωr', and a correction angle Δθ. The translation velocity instruction value Vref is an instruction value (target value) for the translation velocity of the mobile robot 30. The angular rate instruction value ωref is an angular rate in the case of changing the traveling direction clockwise or counterclockwise with respect to the traveling direction. The angular rate instruction value ωref may be defined such that the amount of change in the clockwise direction is a positive value, or the amount of change in the counterclockwise direction is a positive value. The angular rate measured values ωl' and ωr' are angular rates measured by encoders provided for the respective motors 34 and 35. The instruction value calculator $27c_3$ calculates the angular rate instruction values ωl and ωr for changing the traveling direction by the correction angle Δθ while moving the mobile robot 30 according to the translation velocity instruction value Vref and the angular rate instruction value ωref, on the basis of the translation velocity instruction value Vref, the angular rate instruction value ωref, the angular rate measured values ωl' and ωr' and the correction angle Δθ. The instruction value calculator $27c_3$ outputs the calculated angular rate instruction values ωl and ωr to the driver 31.

Figure 10:
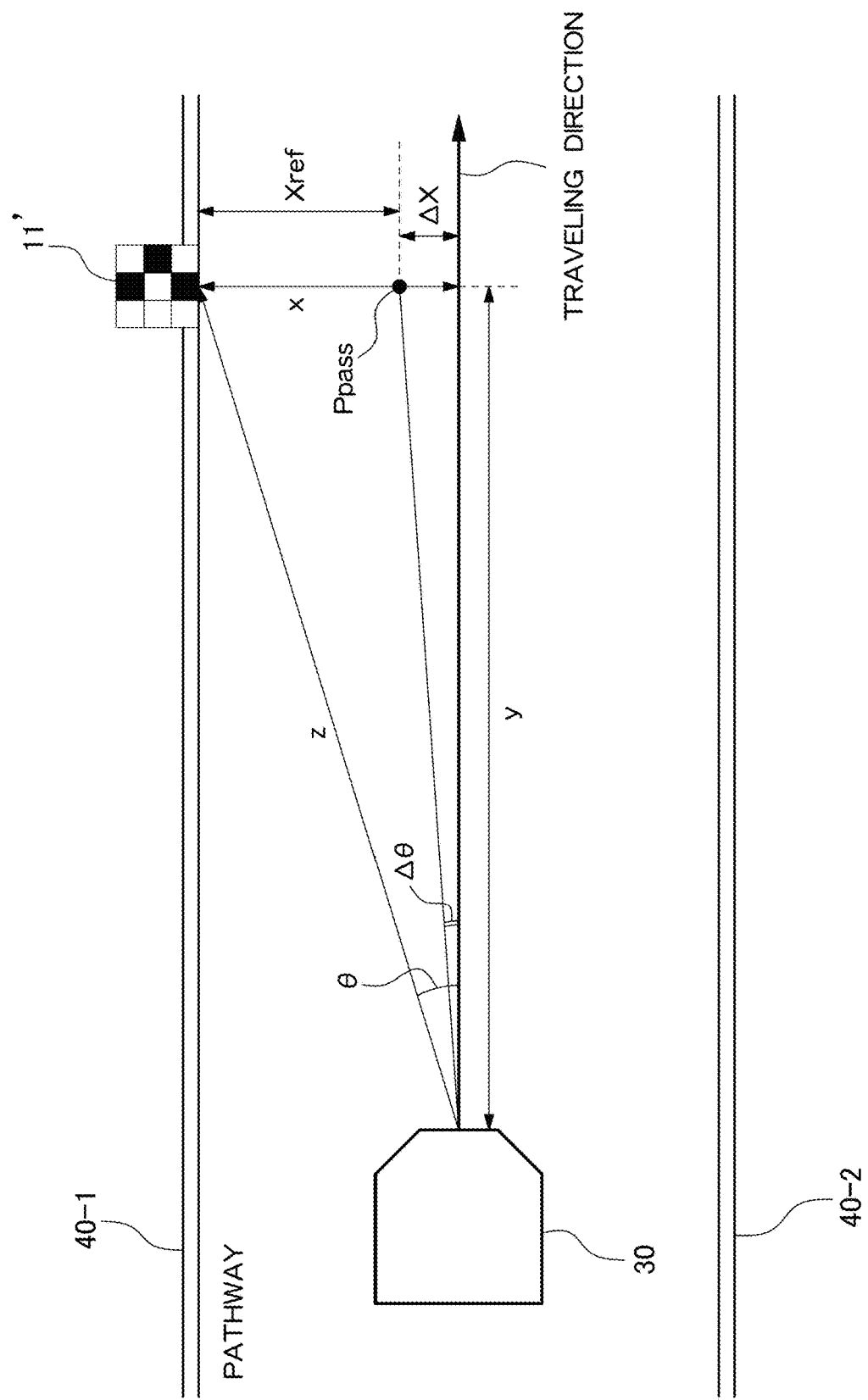
FIG. 10 shows a correction angle $\Delta\theta$ calculated by the drive controller in accordance with this implementation example.

FIG. 10 shows the correction angle Δθ calculated by the drive controller in accordance with this implementation example. The marker detector 22 detects the marker 11' placed on the boundary 40-1, thereby obtaining the distance Z from the mobile robot 30 to the marker 11', and the direction θ in which the marker 11' is positioned with respect to the traveling direction of the mobile robot 30. The passing position calculator $27c_1$ calculates the distance x and the traveling distance y, from the distance Z and the direction θ. The mobile robot 30 is required to change the traveling direction in order to pass a position Ppass away by a predetermined distance from the marker 11' placed along the traveling path. The position Ppass is defined based on information indicating "PLACEMENT SIDE" in the attribute information on the marker 11'. FIG. 10 indicates a case where the marker 11' is placed to the left on the traveling path.

In the example shown in FIG. 10, when the mobile robot 30 travels while maintaining the current traveling direction, the mobile robot 30 passes a position away from the position Ppass by the difference ΔX. The correction angle calculator $27c_2$ calculates the correction angle Δθ to the traveling direction on the basis of the difference ΔX and the traveling distance y. The instruction value calculator $27c_3$ calculates the angular rate instruction values of and ωr for moving the mobile robot 30 according to the translation velocity instruction value Vref and the angular rate instruction value ωref and changing the traveling direction counterclockwise by the correction angle Δθ, and thus controls driver 31. As described above, the drive controller 27c controls the driver 31, thereby allowing the mobile robot 30 to travel on the traveling path defined at the position away from the boundary 40-1 of the pathway by the predetermined distance Xref.

Note that in the example shown in FIG. 10, the case where the marker 11' is placed on the boundary 40-1 has been described. However, in a case where the marker 11' cannot be placed on the boundary 40, the difference between the position where the marker 11' is placed and the boundary 40 is stored, as the pathway distance ($D_1, D_2, \ldots, D_M$), in the table. In this case, for calculation of the correction angle Δθ, the correction angle calculator $27c_2$ corrects any of the distance Xref and the difference ΔX using the pathway distance.

As the mobile robot 30 travels along the traveling path according to the drive control method described above, the mobile robot 30 finally approaches the marker 11' having the marker ID "M" at the destination, and stop control is executed.

Figure 11:
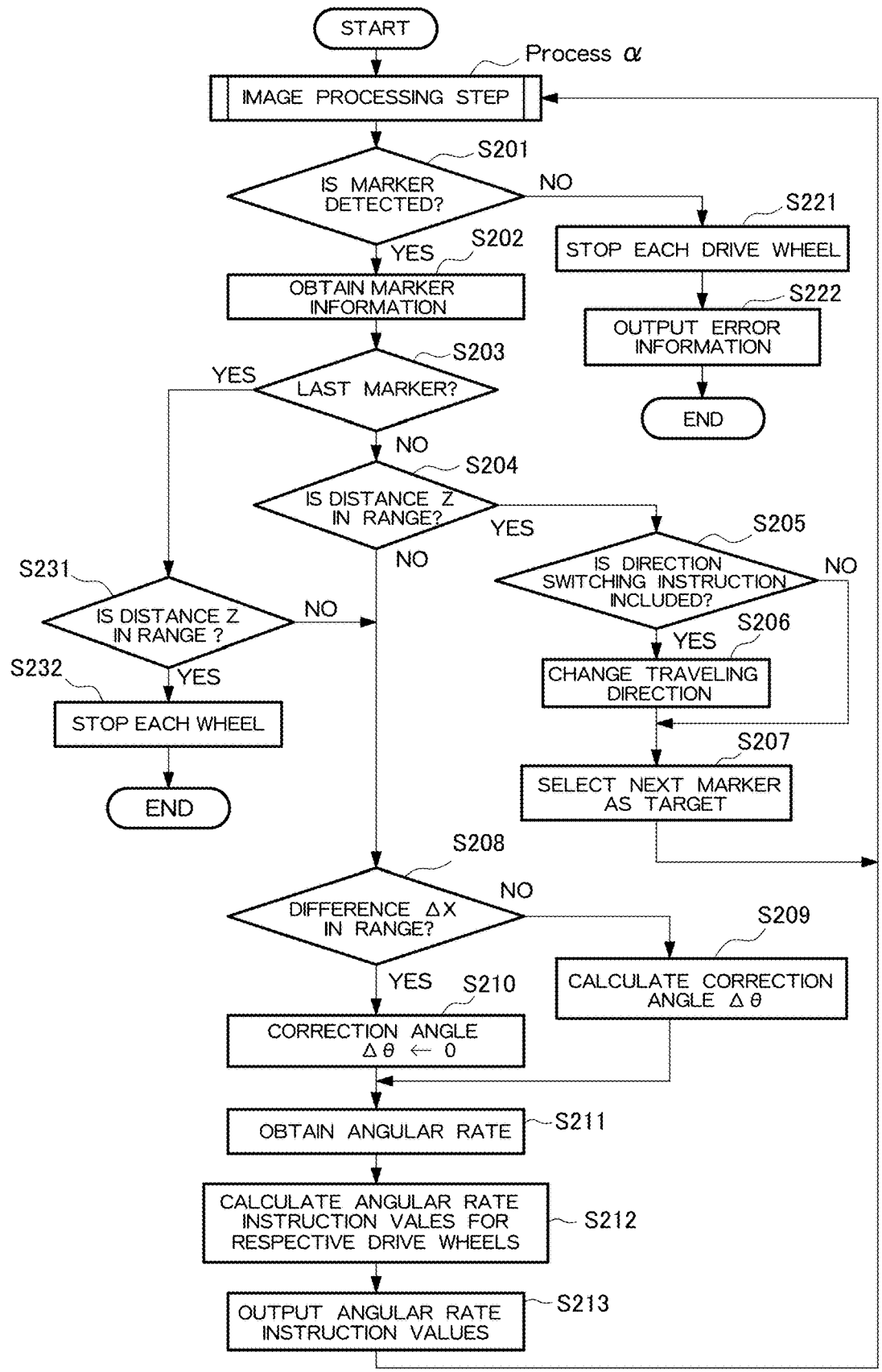
FIG. 11 is a flowchart showing control processing details by the controller in accordance with this implementation example.

Next, referring to FIG. 11, specific processing details in a control system of the mobile robot 30 in accordance with this implementation example are described. FIG. 11 is a flowchart showing the control processing details by the controller in accordance with this implementation example.

When the mobile robot 30 is started to travel, the image processing step (Process α) described with reference to FIG. 3 in the embodiment described above is first executed. By execution of the image processing step (Process α), the calculator 26 obtains the ID information set on the marker 11' and transmits the ID information to the controller 27. The ID information in this implementation example is the marker ID for uniquely identifying each marker ID. The controller 27 having received the marker ID determines whether or not the marker ID set in the initial state is detected or not (step S201). In the initial state, the marker selector 27b selects the marker ID stored on the first row of the table, as the marker ID of the target marker 11'.

When the marker 11' cannot be detected (NO in step S201), the controller 27 outputs an error signal indicating that the marker 11' is not detected. In response to the error signal, the drive controller 27c causes the driver 31 to stop the drive wheels 32 and 33 (step S221). In response to the error signal, the marker selector 27b outputs, to the outside, error information indicating that the marker 11' is not detected (step S222), and finishes the traveling control process. Note that the error information is output using an output device included in the mobile robot 30, for example, a speaker or a display.

In step S201, when the marker 11' is detected (YES in step S201), the marker selector 27b and the drive controller 27c obtain marker information from the calculator 26 of the marker detector 22 (step S202). The marker selector 27b determines whether the marker 11' indicated by the marker information is the last marker or not on the basis of the table (step S203).

In step S203, when the marker 11' is the last marker (YES in step S203), the drive controller 27c determines whether the distance Z to the marker 11' indicated by the marker information is in the switching range or not (step S231). When the distance Z to the marker 11' is in the switching range (YES in step S231), the drive controller 27c causes the driver 31 to stop the drive wheels 32 and 33 (step S232), and finishes the traveling control process.

In step S231, when the distance Z to the marker 11' is not in the switching range (NO in step S231), the drive controller 27c advances the processing to step S208.

In step S203, when the marker 11' is not the last marker (NO in step S203), the drive controller 27c determines whether the distance Z to the marker 11' indicated by the marker information is in the switching range or not (step S204). When the distance Z to the marker 11' is not in the switching range (NO in step S204), the drive controller 27c advances the processing to step S208.

In step S204, when the distance Z to the marker 11' is in the switching range (YES in step S204), the drive controller 27c determines whether the direction switching instruction is included in the attribute information on the marker 11' or not on the basis of the table (step S205). When the direction switching instruction is not included (NO in step S205), the drive controller 27c advances the processing to step S207.

When the direction switching instruction is included (YES in step S205), the drive controller 27c obtains the turning information on the marker 11' from the table, and controls the driver 31 to change the traveling direction of the mobile robot 30 by the angle indicated by the turning information (step S206). The marker selector 27b obtains, from the table, the marker ID of the marker 11' that is to be the next target of the marker 11' currently serving as the target. The marker selector 27b outputs the marker 11' having the obtained marker ID to the marker detector 22 to thereby select the marker 11' having the obtained marker ID as the new target (step S207), and returns the processing to the image processing step (Process α).

In step S208, the correction angle calculator $27c_2$ determines whether the difference ΔX calculated based on the marker information obtained from the marker detector 22 is in an acceptable range or not (step S208). The acceptable range for the difference ΔX is predefined based on the traveling accuracy required for the mobile robot 30, the detection accuracy of the marker 11' in the marker detector 22, the control accuracies of the motors 34 and 35 and the like. When the difference Δx is not in the acceptable range (NO in step S208), the correction angle calculator $27c_2$ calculates the correction angle Δθ on the basis of the difference ΔX (step S209). When the difference ΔX is in the acceptable range (YES in step S208), the correction angle calculator $27c_2$ sets the correction angle Δθ to zero (step S210).

The instruction value calculator $27c_3$ obtains the angular rate measured values ωl' and ωr' of the respective motors 34 and 35, which drive the drive wheels 32 and 33 (step S211). The instruction value calculator $27c_3$ calculates the angular rate instruction values ωl and ωr for the motors 34 and 35 on the basis of the translation velocity instruction value Vref, the angular rate instruction value ωref, the angular rate measured values ωl' and ωr', and the correction angle Δθ (step S212). The instruction value calculator $27c_3$ outputs the angular rate instruction values ωl and ωr to the driver 31 (step S213), and returns the processing to the image processing step (Process α).

The control process including the processes from the image processing step (Process α) to step S232 is performed by the controller 27, which can sequentially obtain the distance Z and the direction θ to the marker 11' and correct the traveling direction. By correcting the traveling direction through such a control process, the mobile robot 30 can travel on the traveling path away from the boundary 40 by the constant distance Xref, and reduce the traveling distance of travel based on the markers 11'.

By the control system of the mobile robot 30 in accordance with this implementation example described above, the identification and distance measurement can be accurately performed even in a case of adopting a relatively compact marker 11' that does not require a large installation place. Furthermore, the control system of the mobile robot 30 in accordance with this implementation example described above can achieve an inexpensive system configuration. Accordingly, the control system of the mobile robot 30 having high general versatility can be provided.

Although the preferable examples of the present invention have thus been described above, the technical scope of the present invention is not limited to the scope described in the aforementioned implementation example. The implementation example can be variously changed or modified.

Figure 12:
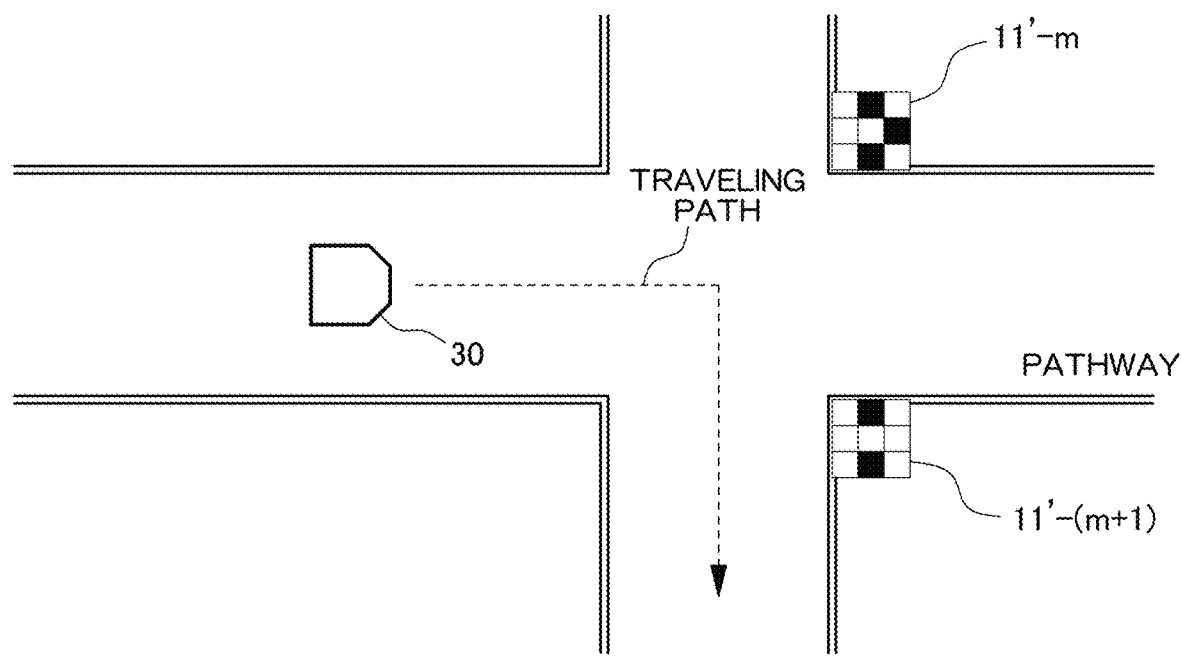
FIG. 12 shows a marker placement example in a case where an intersection resides on a pathway where the mobile robot travels.
Figure 13:
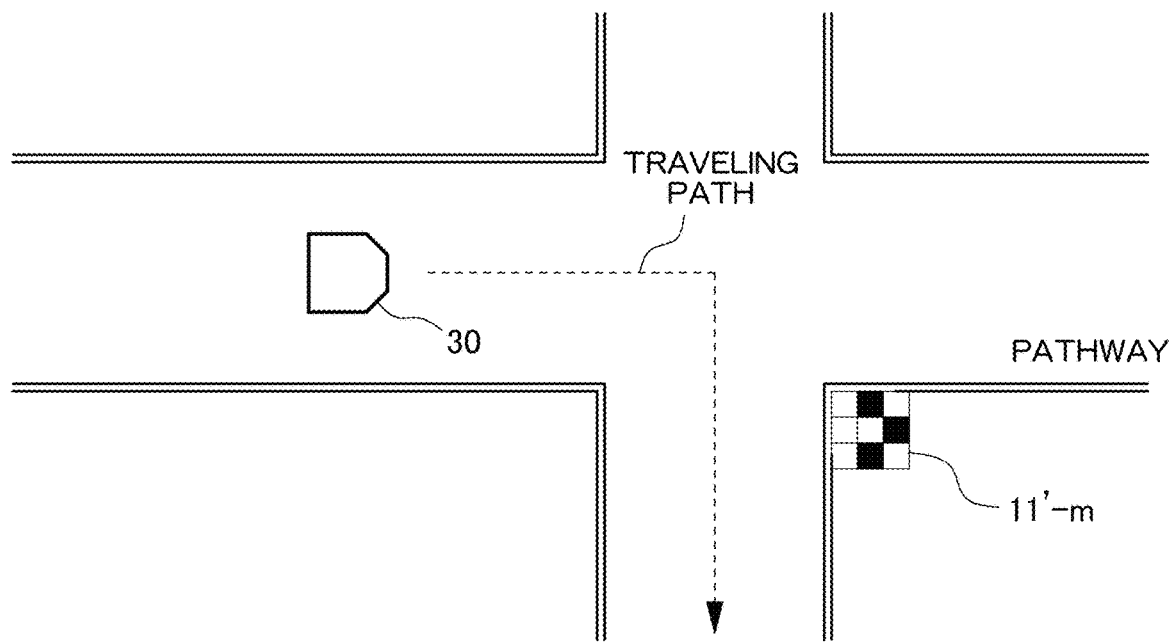
FIG. 13 shows a marker placement example in a case where an intersection resides on a path where the mobile robot travels.

For example, FIGS. 12 and 13 show marker placement examples in a case where an intersection resides on the path where the mobile robot travels. Here, FIG. 12 shows an example where markers 11'-m and 11'-(m+1) are installed at two corners of an intersection that are on a distant side in view from the mobile robot 30. As shown in FIG. 12, in the case where the two markers 11'-m and 11'-(m+1) are installed, the mobile robot 30 may travel to a position where the distances Z and Z' to the respective two markers 11' and 11'-(m+1) are in the switching range, and change the traveling direction by turning by an angle indicated by the turning information. FIG. 13 shows an example where a marker 11'-m is installed at one corner between two corners of an intersection that are on a distant side in view from the mobile robot 30. As shown in FIG. 13, in the case where the marker 11'-m is installed, the mobile robot 30 may travel to a position where the distance Z to the marker 11' is in the switching range, and change the traveling direction by turning by an angle indicated by the turning information.

Figure 14:
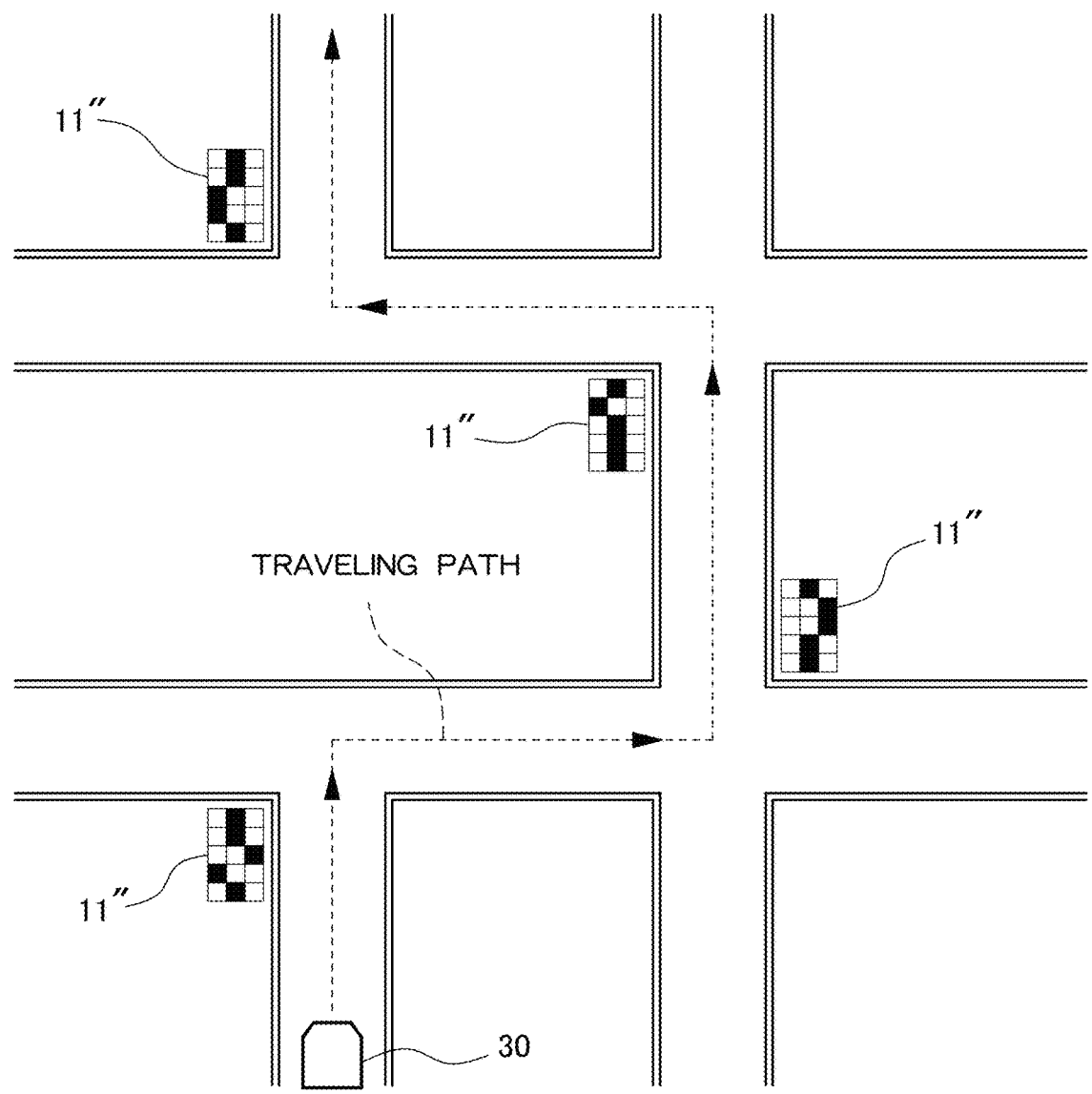
FIG. 14 shows a configuration example of a mobile robot control system in accordance with the present invention in a case where the entire instruction information is assigned to the marker.

For example, in the implementation example described above, the example is described where only the marker ID for uniquely identifying each marker 11' is assigned to the corresponding marker 11', and other instructions for operating the mobile robot 30 are configured as a table stored in the traveling path storage 27a shown in FIG. 8. However, as for the instruction information for operating the mobile robot 30, the entire instruction information may be included in the marker. For example, FIG. 14 shows a configuration example of the mobile robot control system in accordance with the present invention in the case where the entire instruction information is assigned to the marker. In the configuration example shown in FIG. 14, not only the marker ID for uniquely identifying each marker 11" but also instruction information, such as "PATHWAY DISTANCE", "PLACEMENT SIDE", "DIRECTION SWITCHING" and "LAST MARKER" shown in FIG. 8, may be included. Increase in the amount of ID information to be assigned to the marker 11" only requires increase in the number of rows of the ID information assigning positions $B_2$. Accordingly, the amount of information can be increased while increase in the size of the marker itself is suppressed as much as possible, thereby negating the need of a large installation place at a site, such as in a factory or a distribution warehouse. Accordingly, a problem of causing troubles in a field operation does not occur. The entire operation instruction information is included in the mobile robot 30 with respect to each marker 11", thereby allowing the system configuration to be simplified. Furthermore, only by changing the installation place of the marker 11" shown in FIG. 14, the traveling path of the mobile robot 30 can be easily changed. Accordingly, a system that has high general versatility and low cost in comparison with that in the conventional art can be achieved.

Figure 15:
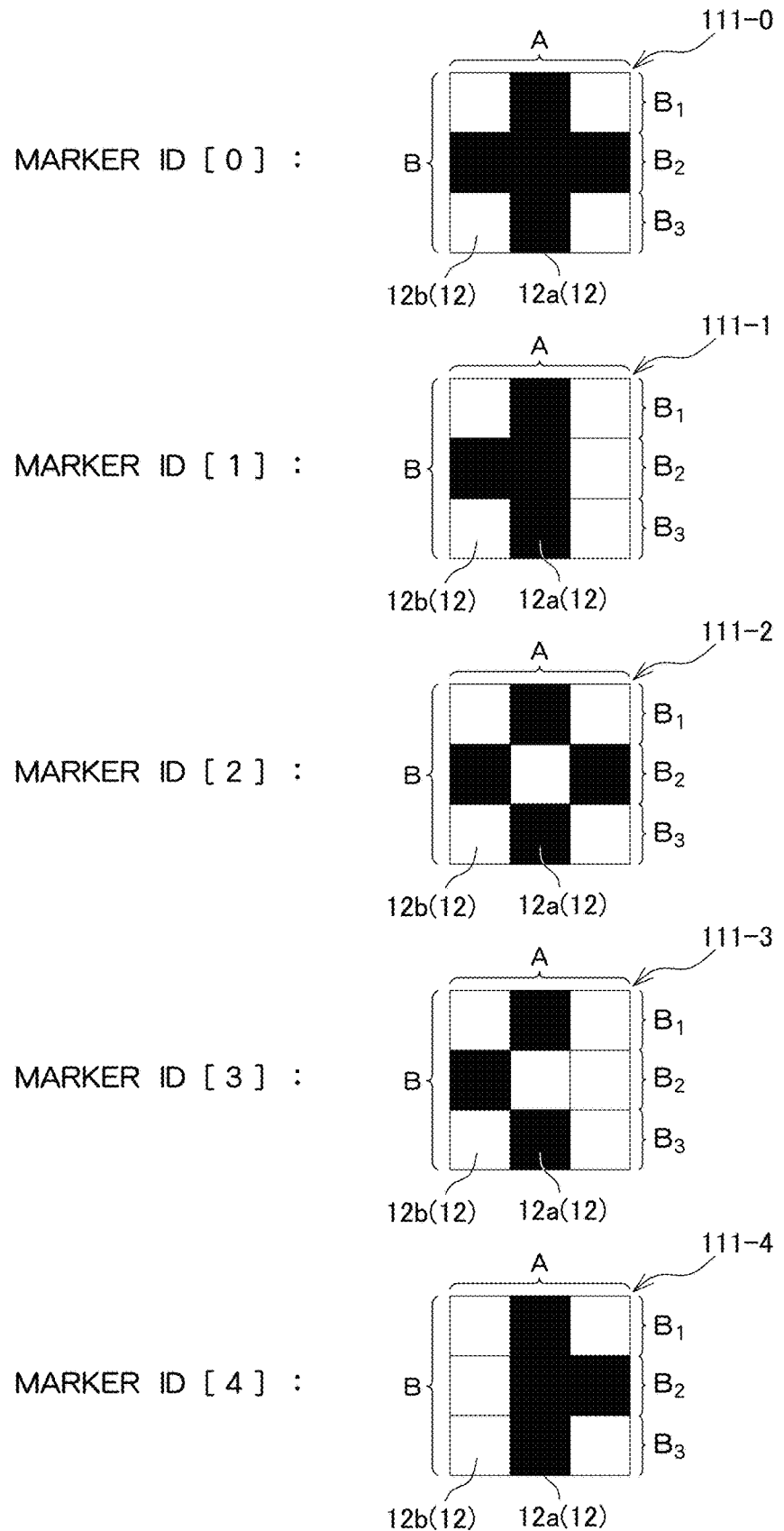
FIG. 15 shows specific examples of markers used for a modified embodiment.
Figure 17:
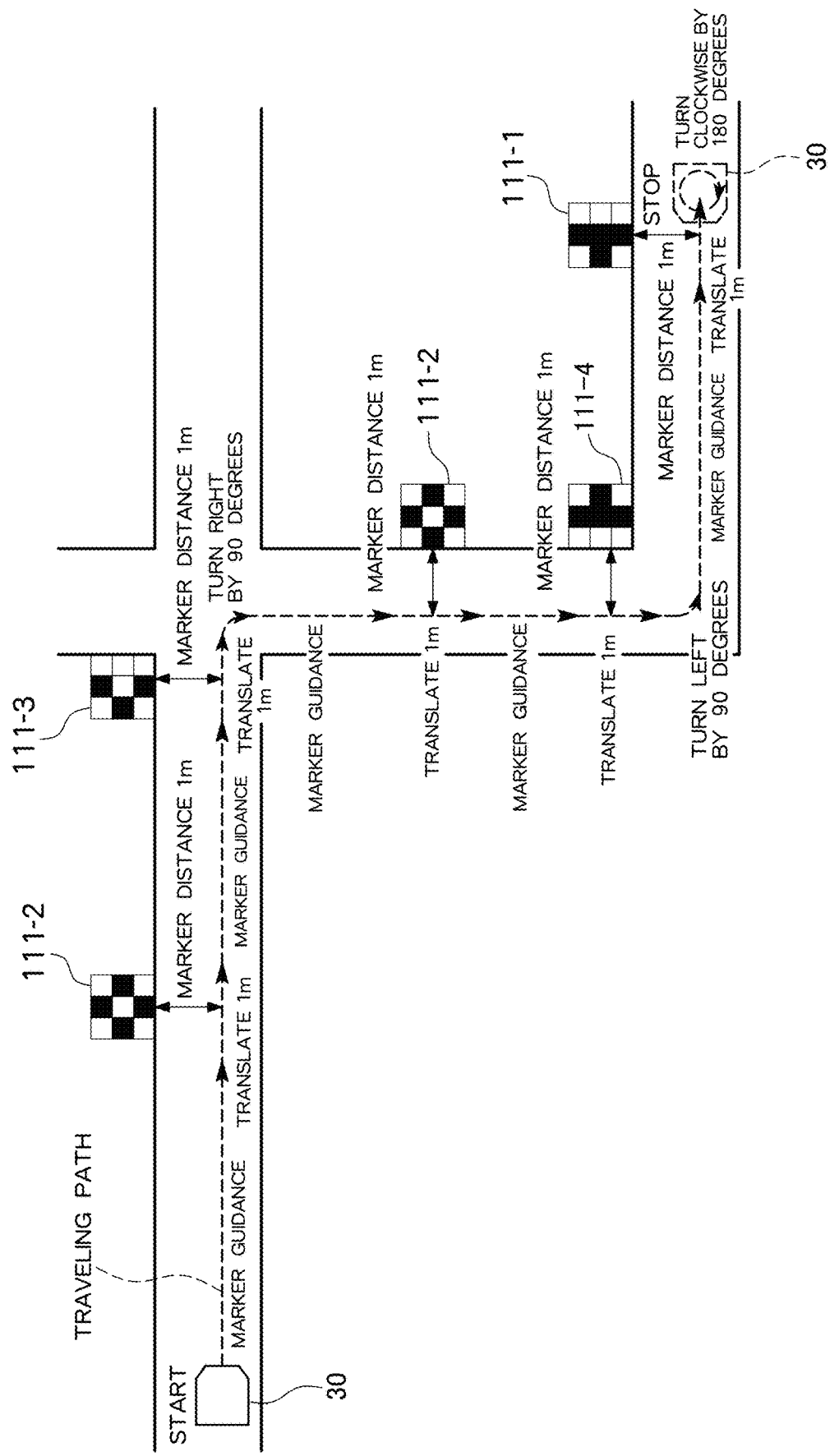
FIG. 17 shows an example where markers used in the modified embodiment are arranged on a pathway where the mobile robot travels, and an operation example of a mobile robot control system in accordance with the modified embodiment.
Figure 18:
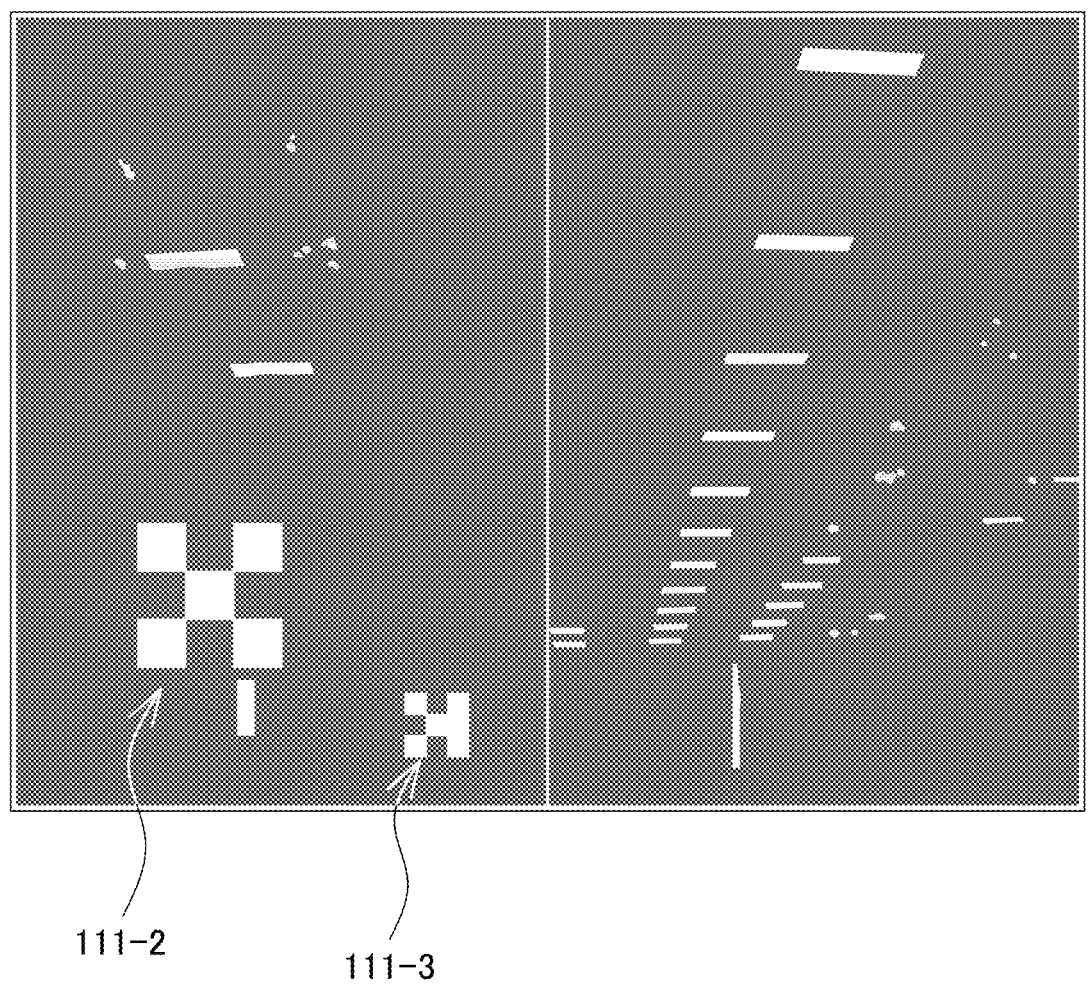
FIG. 18 shows an example of an imaged data item taken by an imager in accordance with the modified embodiment.

For example, as for the configuration example shown in FIG. 14, a further modified embodiment can be exemplified. Referring to FIGS. 15 to 18, a control system of a mobile robot 30 in accordance with the modified embodiment is described. FIG. 15 shows specific examples of markers used for the modified embodiment. FIG. 16 shows an example of a table stored in a traveling path storage in accordance with the modified embodiment. Furthermore, FIG. 17 shows an example where markers used in the modified embodiment are arranged on a pathway where the mobile robot travels, and an operation example of a mobile robot control system in accordance with the modified embodiment. Moreover, FIG. 18 shows an example of an imaged data item taken by an imager in accordance with the modified embodiment.

In this modified embodiment, the cell arrangement of each marker 111 is predefined with respect to the corresponding marker ID. That is, as in the example shown in FIG. 15, for example, in the marker 111-0 with the marker ID set to "0 (zero)", at the ID information assigning position $B_2$ set on one row at the central position, the cells 12 are arranged in an order of "black, black, and black", which can be represented as "0, 0, 0" in the binary code. Similar to the marker 111-0, in the marker 111-1 with the marker ID set to "1", at the ID information assigning position $B_2$, the cells 12 are arranged in an order of "black, black, and white", which can be represented as "0, 0, 1" in the binary code. In the marker 111-2 with the marker ID set to "2", at the ID information assigning position $B_2$, the cells 12 are arranged in an order of "black, white, and black", which can be represented as "0, 1, 0" in the binary code. In the marker 111-3 with the marker ID set to "3", at the ID information assigning position $B_2$, the cells 12 are arranged in an order of "black, white, and white", which can be represented as "0, 1, 1" in the binary code. In the marker 111-4 with the marker ID set to "4", at the ID information assigning position $B_2$, the cells 12 are arranged in an order of "white, black, and black", which can be represented as "1, 0, 0" in the binary code.

On the markers 111 shown in FIG. 15, operation instructions for the respective marker IDs are set. The instruction details are set as a table shown in FIG. 16. The table in accordance with the modified embodiment includes columns of items of "MARKER ID", "OPERATION", "MARKER DISTANCE", "TURN" and "TRANSLATION DISTANCE". The rows indicate attribute information residing for the marker IDs set for the respective markers 111. The rows in the table are arranged in the order of numbers of the marker IDs. In this modified embodiment, this arrangement order does has no meaning. The column of "MARKER ID" includes the marker IDs of the markers 111 corresponding to the respective rows. The column of "OPERATION" includes the operation details of the mobile robot 30 for the markers 111 corresponding to the respective rows. The column of "MARKER DISTANCE" includes distance information indicating the distance by which the mobile robot 30 is apart from the marker 111 corresponding to the row and is allowed to travel. The marker distance is a value set as a positive value, and is a value indicating the distance from the target marker 111 to traveling path of the mobile robot 30. The marker distance in this modified embodiment example indicates the distance by which the mobile robot 30 is kept away to the right of the marker 111, which resides to the left of the pathway.

The column "TURN" includes information indicating a degree by which the mobile robot 30 is to turn in a turning operation, or a degree by which the mobile robot 30 is to turn when stopping. The column of "TURN" also includes information indicating whether the turning direction is left or right. The column of "TRANSLATION DISTANCE" includes distance information indicating further translation of the mobile robot 30 even when the mobile robot 30 approaches the marker 111 corresponding to the row and arrives to have a predetermined distance or reach a switching threshold. In this modified embodiment example, for example, as shown in FIG. 17, when the mobile robot 30 arrives to have the predetermined distance to the marker 111-2 selected first, the mobile robot 30 is switched to the marker 111-3 at the position next nearest to the marker 111-2. Note that at the moment of this switching, it is not switched to the operation instruction in the table set on the marker 111-3 after switching. Alternatively, it is configured such that a translation operation is performed for the marker 111-2 before switching, and then the operation based on the operation instruction in the table set for the marker 111-2 after switching is executed. Such a switching operation of the marker 111 and operation control of the mobile robot 30 are thus performed, thereby achieving smooth operation control.

FIG. 17 shows a specific placement example of the markers 111 described above. Note that the markers 111-0 to 111-4 used in this modified embodiment are placed so as to face the mobile robot 30. However, for the sake of simplicity of description, it is depicted such that the upper side of the sheet is the upper sides of the markers 111-0 to 111-4.

In this modified embodiment, the markers 111-0 to 111-4 are assigned respective marker IDs. For each marker ID, operation instruction information is preset in a table. Accordingly, a user of this system may place the multiple markers 111-0 to 111-4 so as to correspond to the traveling path of the mobile robot 30. Specifically, the example shown in FIG. 17 assumes that the mobile robot 30 is caused to travel straight from a start position disposed on the left side of the sheet to the right on the sheet, is turned right at a first intersection and is subsequently caused to travel straight, is turned left at a next-coming left turn path and is subsequently caused to travel straight, and is turned clockwise by 180 degrees at a final stop position to change the direction of the mobile robot 30 and stop this robot. In this case, to cause the mobile robot 30 to travel straight from the first stop position to the right on the sheet, the marker 111-2 having "marker ID" of "2" is placed at the right of the pathway of the straight path. Next, for right turn at the first intersection, the marker 111-3 having "marker ID" of "3" is placed at the left before the intersection. Next, for straight travel after right turn at the intersection, the marker 111-2 having "marker ID" of "2" is placed at the left of the pathway of the straight path after right turn. For left turn at the next-coming left turn path, the marker 111-4 having "marker ID" of "4" is placed at the left before the left turn path. Lastly, for straight travel after left turn at the left turn path, and clockwise turn by 180 degrees at the last stop position to change the direction of the mobile robot 30 and stop the mobile robot 30, the marker 111-1 having "marker ID" of "1" is placed at the left of the pathway of the last straight path in proximity to the stop position.

The markers 111 are arranged as described above, and then control details for achieving travel of the mobile robot 30 on an assumed traveling path are described. In this modified embodiment, the multiple markers 111 placed on the path are placed so as to have the same ground height. Meanwhile, the two imagers 24 and 25 included in the mobile robot 30 are configured to have a lower position than the ground height where the markers 111 are placed. Consequently, in imaged data items taken by the two imagers 24 and 25, the marker 111 having a shorter distance to the mobile robot 30 is disposed on the upper side in the imaged data items, and is indicated as reflected light covering a larger range in the imaged data items. On the other hand, the marker 111 having a longer distance to the mobile robot 30 is disposed on the lower side in the imaged data items, and is indicated as reflected light covering a smaller range in the imaged data items. Specifically, when the mobile robot 30 is caused to travel straight to the right on the sheet from a start position residing on the left side of the sheet of FIG. 17, the two imagers 24 and 25 included in the mobile robot 30 image the nearer marker 111-2 and the farther marker 111-3. The imaged data item in this case is shown in FIG. 18. The light pattern shown at the lower left corner of the imaged data item indicates the nearer marker 111-2. The light pattern shown in a narrower range at the lower right thereof indicates the farther marker 111-3. Note that as the imaged data item, the example where the mobile robot 30 is operated in a building of a factory is shown. Objects imaged as elongated rectangular light beams in the imaged data item are fluorescent lights installed on the ceiling in the factory.

When the processes shown in FIGS. 2 and 3 are executed using the imaged data item shown in FIG. 18, "2" that is the marker ID of the nearer marker 111-2, and "3" that is the marker ID of the farther marker 111-3 are recognized by the calculator 26. At this time, "2" that is the marker ID of the marker 111-2 indicated at the uppermost position in the imaged data item is selected, from the table, as instruction information according to which the mobile robot 30 is to be operated. Consequently, according to the marker ID of "2" of the table shown in FIG. 16, the mobile robot 30 having obtained imaged data item shown in FIG. 18 receives an operation instruction based on the operation instruction that includes "OPERATION" of TRAVEL STRAIGHT, "MARKER DISTANCE" of 1 m RIGHT, "TURN" of 0 DEGREES, and "TRANSLATION DISTANCE" of 1 m, and travel is performed to a position that slightly exceeds the marker 111-2. Note that when the mobile robot 30 arrives to have the predetermined distance to the currently selected marker 111-2, the mobile robot 30 is switched to the marker 111-3 at the position next nearest to the marker 111-2. Note that at the moment of this switching, it is not switched to the operation instruction in the table set on the marker 111-3 after switching. Alternatively, the translation operation is performed for the marker 111-2 before switching, and then the operation based on the operation instruction in the table set for the marker 111-3 after switching.

The thus described operation control is executed, thereby executing the traveling operation of the mobile robot 30 along the traveling path shown in FIG. 17. Note that in this modified embodiment, the multiple markers 111 placed on the path are placed so as to have the same ground height. On the other hand, the two imagers 24 and 25 included in the mobile robot 30 are configured at a position lower than the ground height at which the markers 111 are placed. However, in the present invention, when a plurality of the detection objects are placed, and a plurality of light beams indicating the markers serving as the detection objects are identified in the imaged data items taken by the imager imaging the light reflected from the white cells 12a serving as the first cells through two cameras, the calculator selects the detection object at a position nearest to the detector, and detects the ID information set at the ID information assigning position of the selected detection object. Selection of the marker serving as the detection object at the position nearest to the detector by the calculator is determined based on the distance between the detector and the selected marker. Consequently, in a case where the multiple markers 111 placed on the path are placed so as to have the same ground height and the positions of the two imagers 24 and 25 included in the mobile robot 30 are higher than the ground height at which the markers 111 are placed, the imaged data items taken by the two imagers 24 and 25 indicates that the marker 111 having a shorter distance to the mobile robot 30 is disposed on the lower side of the imaged data items and indicated as reflected light covering a larger range in the imaged data item. On the other hand, the marker 111 having a longer distance to the mobile robot 30 is disposed on the upper side in the imaged data items, and is indicated as reflected light covering a smaller range in the imaged data items. That is, in accordance with the position relationship between the ground height of the markers 111 and the two imagers 24 and 25, the marker serving as the detection object disposed at a position nearest to the detector can be selected by the calculator on the basis of the position or size of the light indicated in the imaged data items. By adopting such a configuration, the present invention can achieve the mobile robot control system inexpensively.

Referring to FIGS. 15 to 18, the control system of the mobile robot 30 in accordance with the modified embodiment has thus been described above. In the modified embodiment described above, the case of adopting the marker 111 as the detection object is exemplified. However, for this modified embodiment, a beacon that transmits a signal based on a predetermined rule can be adopted as the detection object. In this case, the beacon turns on and off flashing signals in units of several milliseconds. Accordingly, the two imagers 24 and 25 takes multiple imaged data items corresponding to the flashing signals of the beacon, and verifies the on and off states of the flashing signals in a time-series manner on the basis of the imaged data items, thereby allowing the ID information on each beacon to be detected, similar to the markers 111 described above.

That is, an image processing device in accordance with the present invention can be configured as an image processing device, including: a detection object including a beacon emitting a signal based on a predetermined rule; and a detector receiving the signal transmitted from the detection object, and obtaining signal information set on the detection object, based on the received signal, wherein when a plurality of the detection objects are placed, the detector selects the detection object nearest to the detector, based on signal information obtained from the detection objects, and detects ID information set on the selected detection object.

Moreover, a mobile robot control system in accordance with the present invention can be configured as a mobile robot control system, including: a driver changing a traveling speed and a traveling direction of a mobile robot; a detector detecting a plurality of detection objects placed along a traveling path to a destination; and a controller performing drive control of the driver, based on ID information set on the detection object detected by the detector, and wherein the detection object includes a beacon emitting a signal based on a predetermined rule, wherein when a plurality of the detection objects are placed, the detector selects the detection object nearest to the detector, based on signal information obtained from the detection objects, and detects ID information set on the selected detection object.

Furthermore, a mobile robot control method in accordance with the present invention can be configured as a mobile robot control method of controlling a mobile robot, the mobile robot including: a driver changing a traveling speed and a traveling direction of the mobile robot; a detector detecting a plurality of detection objects placed along a traveling path to a destination; and a controller obtaining ID information set on the detection object detected by the detector, wherein the detection object includes a beacon emitting a signal based on a predetermined rule, and when a plurality of the detection objects are placed, the detector selects the detection object nearest to the detector, based on signal information obtained from the detection objects, and detects ID information set on the selected detection object, the mobile robot control method including causing the controller to perform drive control of the driver, based on the ID information on the driver nearest to the detector.

Although the preferable implementation examples and modified embodiment example of the present invention have thus been described above, the technical scope of the present invention is not limited to the scope described in the aforementioned implementation example and modified embodiment example. The implementation examples and modified embodiments can be variously changed or modified.

For example, in this implementation example, the operation according to which the calculator 26 of the marker detector 22 calculates the entire marker information on all the detected markers 11', and outputs the calculated pieces of marker information to the controller 27, has been described. In this case, the marker selector 27b of the controller 27 selects a piece of marker information on the target marker 11' from among pieces of marker information on the basis of the instruction output from the marker selector 27b. However, the marker detector 22 can adopt a configuration of performing an operation of detecting the marker 11' having the marker ID input from the marker selector 27b. The image processing device and the mobile robot control system in accordance with the present invention can adopt various modified embodiments of configurations and operation procedures within a range capable of achieving working effects similar to those achieved by the embodiments and implementation examples described above.

For example, the mobile robot 30 described above may internally include a computer system. In this case, the processing procedures performed by the controller 27 included in the mobile robot 30 are stored in a form of a program in a computer-readable recording medium. The computer reads and executes the program, thereby performing the process of each functional unit. Here, the computer-readable recording medium is a magnetic disk, a magneto-optical disk, a CD-ROM, a DVD-ROM, a semiconductor memory or the like. The computer program may be distributed to the computer via a communication line, and the computer having received this distribution may execute the program.

For example, the arrangement configuration of the white cells 12a and the black cells 12b on the marker 11, 11' and 11" shown in the embodiments and implementation examples described above have only been exemplified. Any pattern configuration can be adopted as the combination of the white cells 12a and the black cells 12b on the marker applicable to the present invention. In particular, the combinations of arrangements of the white cells 12a and the black cells 12b at the detection start position $B_1$ and the detection end position $B_3$ are not necessarily same as each other. Predefined pattern configuration may be adopted for each.

Note that the implementation example described above is only presented as an example. There is no intention to limit the scope of the present invention. Such novel implementation examples can be implemented in various forms. Various types of omission, replacement, and change may be performed without departing from the spirit of the invention. These implementation examples and their modifications are included in the scope of the invention and summary, and also in the invention described in claims and the scope of their equivalents.

According to the description of claims, it is obvious that such variously changed or modified modes can also be included in the technical scope of the present invention.

REFERENCE NUMERALS

10 Image processing device; 11, 11', 11", 111 Marker (detection object); 12 Cell; 12a White cell (first cell); 12b Black cell (second cell); 21 Image processing device main body; 22 Marker detector (detector); 23 Illuminator; 24, 25 Imager; 26 Calculator; 27 Controller; 27a Traveling path storage; 27b Marker selector; 27c Drive controller; $27c_1$ Passing position calculator; $27c_2$ Correction angle calculator; $27c_3$ Instruction value calculator; 30 Mobile robot; 31 Driver; 32, 33 Drive wheel; 34, 35 Motor; 36 Motor controller; 40, 40-1, 40-2 Boundary; $B_1$ Detection start position; $B_2$ ID information assigning position; $B_3$ Detection end position.

The invention claimed is:

1. An image processing device, comprising:
    a detection object including cells having first cells capable of reflecting emitted light and second cells incapable of reflecting the emitted light, the cells being squares or rectangles, the first cells and the second cells being arranged in an a×a or a×b (where a, b=3, 4, 5, 6, . . .) matrix on a two-dimensional plane; and
    a detector including
        an illuminator emitting light,
        an imager imaging, by a camera, light reflected from the first cells after the first cells and the second cells constituting the detection object are illuminated with the light emitted from the illuminator, and
        a calculator obtaining information set on the detection object, based on an imaged data item taken by the imager, wherein
    in the detection object,
    a plurality of the cells constituting a first row or first column of the matrix arrangement serve as a detection start position,
    a plurality of the cells constituting a last row or last column of the matrix arrangement serve as a detection end position,
    a plurality of the cells constituting one or more rows or columns residing between the detection start position and the detection end position serve as one or more ID information assigning positions.

2. The image processing device according to claim 1, wherein
    the imager or the calculator included in the detector applies a binarization process to the imaged data item taken by the imager, scans a binarized image obtained by the binarization process, for the detection start position in a horizontal direction or a vertical direction, to calculate a dimension of the cell on the binarized image, calculates coordinates of the one or more ID information assigning positions residing at multiple number positions of the calculated dimension and of the detection end position, on the binarized image, and performs a scan for each of the one or more ID information assigning positions and the detection end position, based on the coordinates, to obtain ID information set at the one or more ID information assigning positions.

3. The image processing device according to claim 2, wherein
the scan for the detection start position, the one or more ID information assigning positions, and the detection end position performed by the imager or the calculator included in the detector is performed in an order of the detection start position, the detection end position, and the one or more ID information assigning positions.

4. The image processing device according to claim 2, wherein
when a plurality of the imaged data items taken by the imager imaging the light reflected from the first cells through two cameras are present, the calculator selects the detection object to be adopted at a current time, based on the obtained ID information.

5. The image processing device according to claim 2, wherein
when a plurality of the detection objects are placed, and a plurality of light beams indicating the detection objects are identified in the imaged data items taken by the imager imaging the light reflected from the first cells through two cameras, the calculator selects the detection object at a position nearest to the detector, and detects the ID information set at the ID information assigning position of the selected detection object.

6. The image processing device according to claim 5, wherein
selection of the detection object at the position nearest to the detector by the calculator is determined based on a distance between the detector and the selected detection object.

7. The image processing device according to claim 6, wherein
the placed detection objects are configured to have an identical ground height, and determination of the selection of the detection object at the position nearest to the detector by the calculator is performed based on positions or sizes of the light beams indicating the detection objects present in the imaged data items taken by the imager.

8. The image processing device according to claim 1, wherein
the scan for the detection start position, the one or more ID information assigning positions, and the detection end position performed by the imager or the calculator included in the detector is performed in an order of the detection start position, the detection end position, and the one or more ID information assigning positions.

9. A mobile robot control system, comprising:
a driver changing a traveling speed and a traveling direction of a mobile robot;
a detector detecting a plurality of detection objects placed along a traveling path to a destination; and
a controller obtaining a distance and a direction to the detection object detected by the detector, calculating the traveling direction allowing the distance and the direction to the detection object to satisfy a predetermined relationship, and performing drive control of the driver, based on the calculated traveling direction, wherein the detection object is configured as a marker including first cells capable of reflecting emitted light and second cells incapable of reflecting the emitted light, the cells being squares or rectangles, the first cells and the second cells being arranged in an a×a or a×b (where a, b=3, 4, 5, 6, . . .) matrix on a two-dimensional plane, and
the detector includes:
an illuminator emitting light;
an imager imaging, by a camera, light reflected from the first cells after the first cells and the second cells constituting the marker are illuminated with the light emitted from the illuminator; and
a calculator calculating a distance and a direction to the marker, based on an imaged data item taken by the imager, wherein
in the detection object,
a plurality of the cells constituting a first row or first column of the matrix arrangement serve as a detection start position,
a plurality of the cells constituting a last row or last column of the matrix arrangement serve as a detection end position,
a plurality of the cells constituting one or more rows or columns residing between the detection start position and the detection end position serve as one or more ID information assigning positions.

10. A mobile robot control method of controlling a mobile robot, the mobile robot including:
a driver changing a traveling speed and a traveling direction of the mobile robot;
a detector detecting a plurality of detection objects placed along a traveling path to a destination; and
a controller obtaining a distance and a direction to the detection object detected by the detector, wherein
the detection object is configured as a marker including first cells capable of reflecting emitted light and second cells incapable of reflecting the emitted light, the cells being squares or rectangles, the first cells and the second cells being arranged in an a×a or a×b (where a, b=3, 4, 5, 6, . . .) matrix on a two-dimensional plane, and
the detector includes:
an illuminator emitting light;
an imager imaging, by a camera, light reflected from the first cells after the first cells and the second cells constituting the marker are illuminated with the light emitted from the illuminator; and
a calculator calculating a distance and a direction to the marker, based on an imaged data item taken by the imager, wherein
in the detection object
a plurality of the cells constituting a first row or first column of the matrix arrangement serve as a detection start position,
a plurality of the cells constituting a last row or last column of the matrix arrangement serve as a detection end position,
a plurality of the cells constituting one or more rows or columns residing between the detection start position and the detection end position serve as one or more ID information assigning positions, the mobile robot control method comprising causing the controller to calculate the traveling direction allowing the distance and the direction to the detection object to satisfy a predetermined relationship, and to perform drive control of the driver, based on the calculated traveling direction.

* * * * *